US005396074A

United States Patent [19]

Peck et al.

[11] Patent Number: 5,396,074

[45] Date of Patent: Mar. 7, 1995

[54] IRRADIATION SYSTEM UTILIZING CONVEYOR-TRANSPORTED ARTICLE CARRIERS

[75] Inventors: Richard O. Peck, Lakewood; Gary M. Pageau, Englewood; Colin B. Williams, Denver, all of Colo.; John T. Allen, San Diego, Calif.; Bernard G. Wickersham, Parker, Colo.; Leonard C. Bisgrove, Evergreen, Colo.; Bruce D. Sellers, Aurora, Colo.

[73] Assignee: The Titan Corporation, San Diego, Calif.

[21] Appl. No.: 33,392

[22] Filed: Mar. 19, 1993

[51] Int. Cl.[6] ............ G01N 21/00

[52] U.S. Cl. ............ 250/453.11; 250/454.11

[58] Field of Search ............ 250/453.11, 454.11, 250/455.11, 492.1, 492.3

[56] References Cited

U.S. PATENT DOCUMENTS

| | | | |
|---|---|---|---|
| 924,284 | 6/1909 | Smith . | |
| 1,809,078 | 6/1931 | Smith . | |
| 2,095,502 | 10/1937 | Johnston | 21/54 |
| 2,602,751 | 7/1952 | Robinson | 99/221 |
| 2,989,735 | 6/1961 | Gumpertz | 340/174.1 |
| 3,087,598 | 4/1963 | Clore | 198/38 |
| 3,224,562 | 12/1965 | Bailey et al. | 250/453.11 |
| 3,261,140 | 7/1966 | Long et al. | 53/22 |
| 3,452,195 | 6/1969 | Brunner | 250/454.11 |
| 3,564,241 | 2/1971 | Ludwig | 250/454.11 |
| 3,676,675 | 7/1972 | Ransohoff et al. | 250/454.11 |
| 3,915,284 | 10/1975 | Knockeart et al. | 198/34 |
| 4,020,354 | 4/1977 | Fauss et al. | 250/453.11 |
| 4,166,673 | 9/1979 | Dona | 350/97 |
| 4,561,358 | 12/1985 | Burgess | 250/453.11 |
| 4,690,751 | 9/1987 | Umiker | 209/3.3 |
| 4,839,485 | 6/1989 | Koch et al. | 219/10.55 |
| 4,852,138 | 7/1989 | Bergeret et al. | 250/453.11 |
| 4,978,501 | 12/1990 | Diprose et al. | 422/22 |
| 5,096,553 | 3/1992 | Ross et al. | 204/157.15 |

*Primary Examiner*—Bruce C. Anderson
*Attorney, Agent, or Firm*—Edward W. Callan

[57] ABSTRACT

An article irradiation system includes a radiation source disposed along a horizontal axis; a plurality of article carriers; a process conveyor for supporting and transporting the article carriers past the radiation source at a first speed; an overhead power and free transport conveyor for transporting the article carriers from a loading area at a second speed that differs from the first speed; and a load conveyor adapted for engaging the article carriers and for transporting the engaged article carriers from the transport conveyor to the process conveyor at a speed that is varied during transport by the load conveyor in such a manner that the article carriers are so positioned on the process conveyor that there is a predetermined separation distance between adjacent positioned article carriers. A reroute conveyor is coupled to the process conveyor for transporting those article carriers carrying articles that have received radiation impinging upon only the first side of the articles. A rack disposed adjacent the reroute conveyor reorients about a vertical axis by 180 degrees the article carriers being transported by the reroute conveyor; and the reoriented article carriers are transported from the reroute conveyor to the process conveyor for retransportation past the radiation source so that a second side of the carried articles opposite to the first side receives impinging radiation from the radiation source.

62 Claims, 9 Drawing Sheets

FIG. 7A
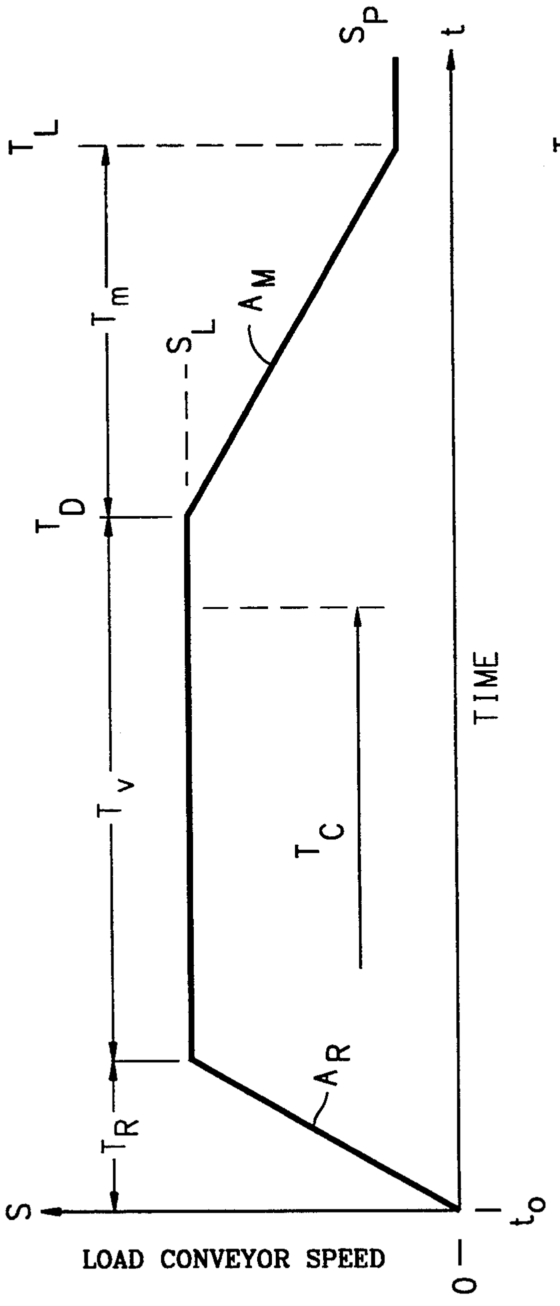
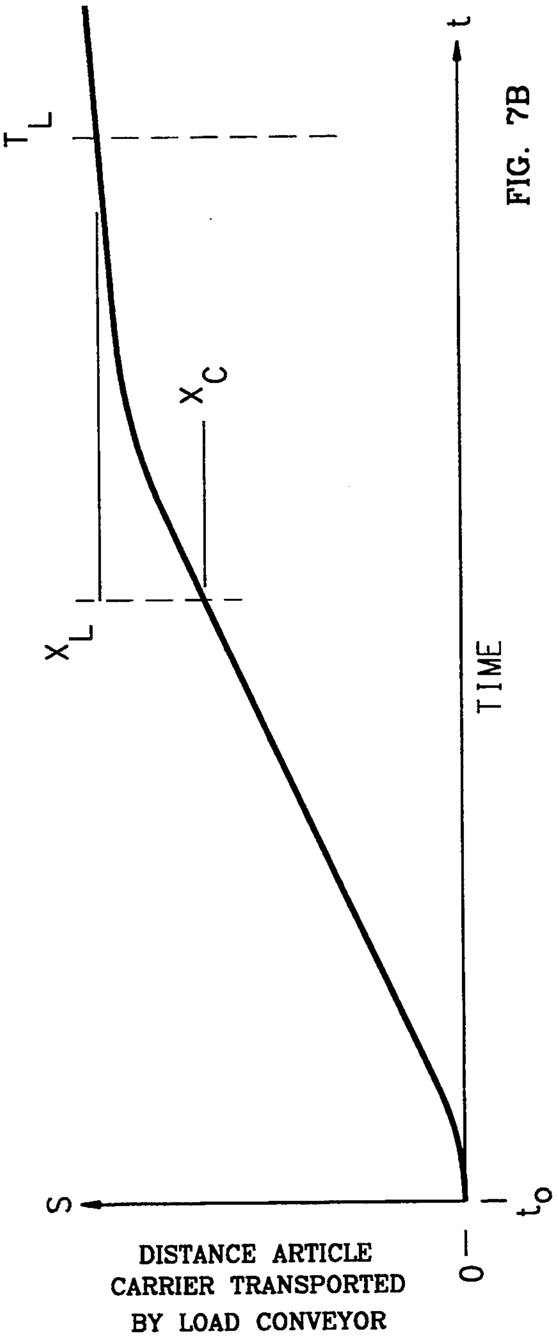
FIG. 7B

IRRADIATION SYSTEM UTILIZING CONVEYOR-TRANSPORTED ARTICLE CARRIERS

BACKGROUND OF THE INVENTION

The present invention generally pertains to irradiation systems that utilize a conveyor for transporting articles past a radiation source and is particularly directed to conveyor systems that transport article carriers past a given location and to the article carriers used therewith.

Irradiation systems are used for irradiating articles, such as foodstuffs, food utensils, medical devices, consumer goods, cosmetics, and waste products and their containers, with high energy electromagnetic radiation, such as an electron beam, X-rays and microwaves, for the purpose of sterilizing such articles.

It is known to irradiate articles by utilizing a system that includes a radiation source; a plurality of article carriers; and a process conveyor for transporting the article carriers past the radiation source, with the radiation source being mounted perpendicular to the conveyor and disposed along an approximately horizontal axis for irradiating the articles as they are transported past the radiation source by the process conveyor. It is also known to reorient an article carrier suspended from a power-and-free conveyor by 180 degrees after the article carrier has been transported past the radiation source and to transport the reoriented article carrier past the radiation source again so that the articles carried by the article carrier can be irradiated from the opposite side to symmetrically complement the irradiation during the initial transportation past the radiation source. The article carrier is suspended from the power-and-free conveyor track at both its leading and trailing ends, and is reoriented by diverting the leading end to an unpowered branch track that loops off to one side and then rejoins the main track, and then causing the trafiing end to move along the powered main track so that the trafiing end takes the lead and pulls the diverted end from the branch track to the main track in a trailing position.

SUMMARY OF THE INVENTION

In one aspect, the present invention provides an article irradiation system, comprising a radiation source; a plurality of article carriers; a process conveyor for supporting and transporting the article carriers past the radiation source at a first speed; a transport conveyor for transporting the article carriers from a loading area at a second speed that differs from said first speed; and a load conveyor adapted for engaging the article carriers and for transporting the engaged article carriers from the transport conveyor to the process conveyor at a speed that is varied during said transport by the load conveyor in such a manner that the article carriers are so positioned on the process conveyor that there is a predetermined separation distance between adjacent positioned article carriers. This system may be utilized to consistently closely position the article carriers on the process conveyor so as to efficiently utilize the radiation emitted by the radiation source.

In another aspect, the present invention provides an article irradiation system, comprising a radiation source; a plurality of article carriers; and a process conveyor for transporting the article carriers past the radiation source; wherein the radiation source is disposed along an approximately horizontal axis and the process conveyor is disposed in relation to the radiation source such that articles carried by article careers having a first horizontal orientation receive radiation impinging upon a first side of the articles; the system further comprising a reroute conveyor coupled to the process conveyor for transporting said article carriers carrying articles that have received radiation impinging upon only the first side of the articles; passive means disposed adjacent the reroute conveyor for reorienting the article carriers about a vertical axis by 180 degrees as the article carriers are being transported by the reroute conveyor; and means for transporting the reoriented article carriers from the reroute conveyor to the process conveyor for retransportation past the radiation source by the process conveyor so that a second side of said carried articles opposite to said first side receives impinging radiation from the radiation source. The horizontal disposition of the radiation source reduces the height of the structure that must be constructed of shielding material, such as reinforced concrete, in order to house the radiation source. By utilizing passive means disposed adjacent the reroute conveyor for reorienting the article carriers as they are being transported by the reroute conveyor in order to enable the articles to be irradiated from opposite sides without having to handle cartons containing the articles, the articles are efficiently reoriented with respect to the radiation source for retransportation past the radiation source. Handling of the cartons in order to reorient the cartons often also reorients the articles within the cartons so that irradiation during such retransportation does not symmetrically complement the irradiation during the initial transportation past the radiation source. Also, by eliminating such handling of the articles for reorientation thereof, the throughput efficiency of the irradiation system is improved.

In a further aspect, the present invention provides an article irradiation system, comprising a radiation source; a plurality of article carriers; and a process conveyor for transporting the article carriers past the radiation source; wherein the radiation source is adapted for scanning articles carried by the article carriers being transported by the process conveyor with a radiation beam that scans the transported articles at a given rate in a plane perpendicular to the direction of transport: means adapted for measuring a speed at which said article carrier is being transported past the radiation source: means adapted for processing said measurements to determine whether said article carrier transport speed is outside of a given range; and means responsive to a processing means for interrupting both radiation from said radiation source and said transport by the conveyor when the processing means determine that the article carrier transport speed is outside of said given range. This system prevents the articles from receiving an incorrect dosage of radiation as a result of being transported past the radiation source by the process conveyor at a speed that results in the articles receiving either too much or too little radiation, whereby the desired results are not achieved and/or the composition of the articles may be damaged.

In yet a further aspect, the present invention provides an article carrier adapted for transport by an overhead conveyor having a track, the carrier comprising a trolley that rides on the conveyor track and is coupled to the article carrier in such a manner as to rotatable suspend the article carrier from the conveyor; and a collar attached to the top of the article carrier, wherein the collar is rotatable in relation to the trolley and non-rotatable in relation to the article carrier. This article carrier can be reoriented while suspended from the conveyor.

In still another aspect, the present invention provides an article carrier adapted for transport by a conveyor, the carrier comprising a striker tab extending from one side of the carrier for engagement with a switch contact mounted in a stationary position in relation to the conveyor when the carrier has a predetermined orientation in relation to the conveyor as the article carrier is being transported by the conveyor.

In yet another aspect, the present invention provides an article carrier adapted for transport by an overhead conveyor having a track, by a process conveyor upon which the carrier is supported and by a load conveyer which transports the carrier onto the process conveyor from the transport conveyor, the carrier comprising a trolley adapted to ride on the conveyor track and to suspend the article carrier from the overhead conveyor and at least one lug extending from the bottom of the carrier for engaging a dog attached to the load conveyor for enabling the load conveyor to transport the carrier.

In yet still another aspect, the present invention provides an article carrier adapted for transport by a conveyor, the carrier comprising a member having a serrated edge extending away from the article carrier for engagement by a limit switch disposed in relation to the conveyor so as to be periodically operated by contact with the serrated edge of said member as a said article carrier is being transported by the process conveyor. This article carrier enables the speed at which the article carrier is being transported to be monitored by measuring the frequency of said operation of the limit switch by contact with the serrated edge of the member extending from the article carrier.

In yet still a further aspect, the present invention provides an article carrier adapted for transport by a conveyor, the carrier comprising end members as defined by the direction in which the article carrier is transported by the process conveyor, with the end members having supporting struts disposed on the outside of said end members; wherein the struts are disposed differently on one end member than on the other end member so that the struts on one said article carrier cannot contact the struts on another said article carrier positioned adjacent thereto on the process conveyor with the same lateral orientation as the one said article carrier notwithstanding the end-to-end orientation of the article carriers, whereby the article carriers can be positioned closer together on the process conveyor than would be possible if the struts on one said article carrier could contact the struts on another said article carrier when said article carriers are positioned adjacent each other on the process conveyor with said same lateral orientation.

Additional features of the present invention are described in relation to the detailed description of the preferred embodiments.

BRIEF DESCRIPTION OF THE DRAWING

FIG. 7A is a characteristic curve of the speed of the load conveyor as a function of time.

FIG. 7B is a characteristic curve of the distance over which each article carrier is transported by the load conveyor as a function of time, with FIG. 7B having the same time scale as FIG. 7A.

DETAILED DESCRIPTION

Figure 1:
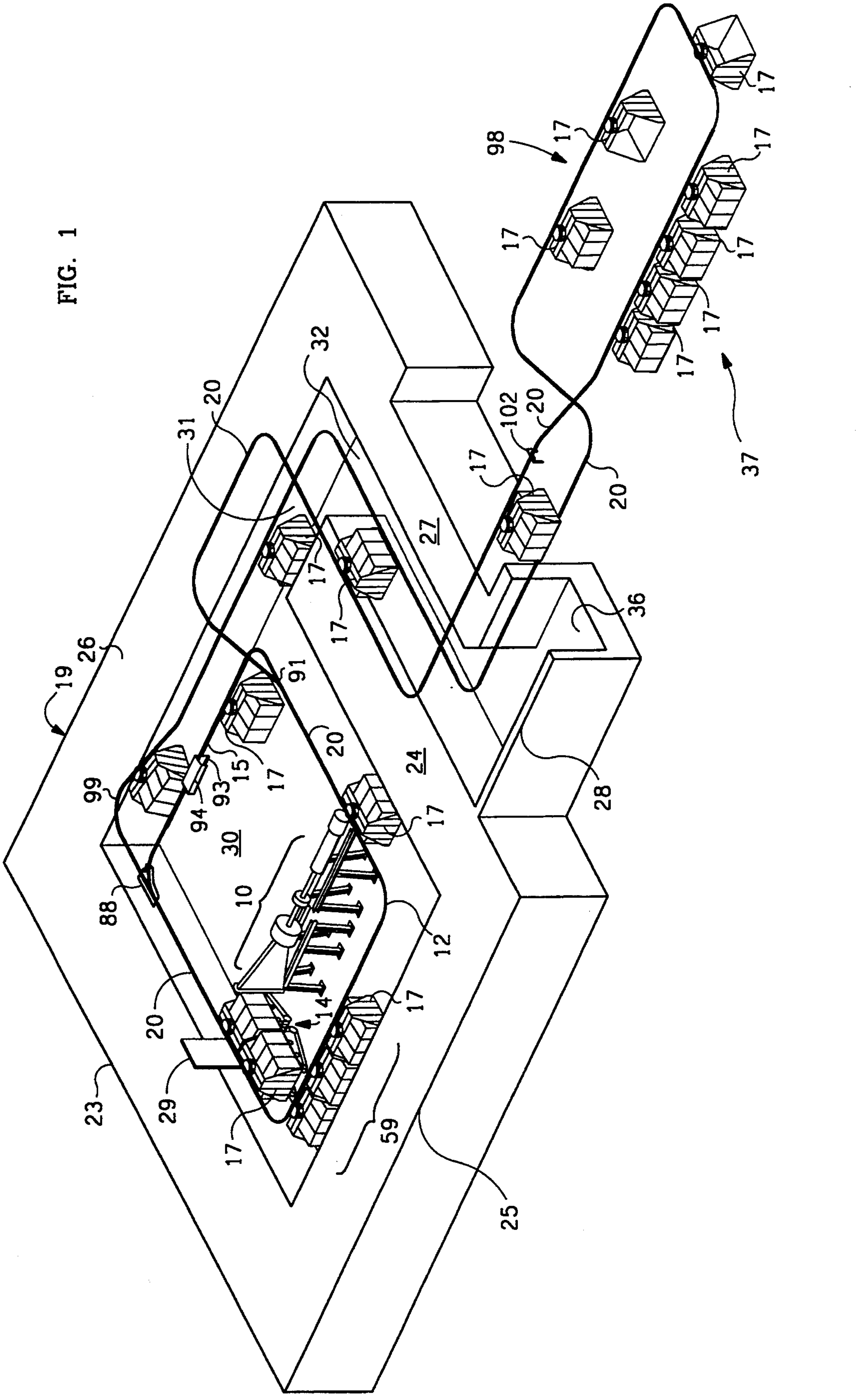
FIG. 1 illustrates a preferred embodiment of the irradiation system of the present invention, with the ceiling and the upper portion of the walls of the housing not being shown in order to better illustrate the irradiation system contained therein.
Figure 2:
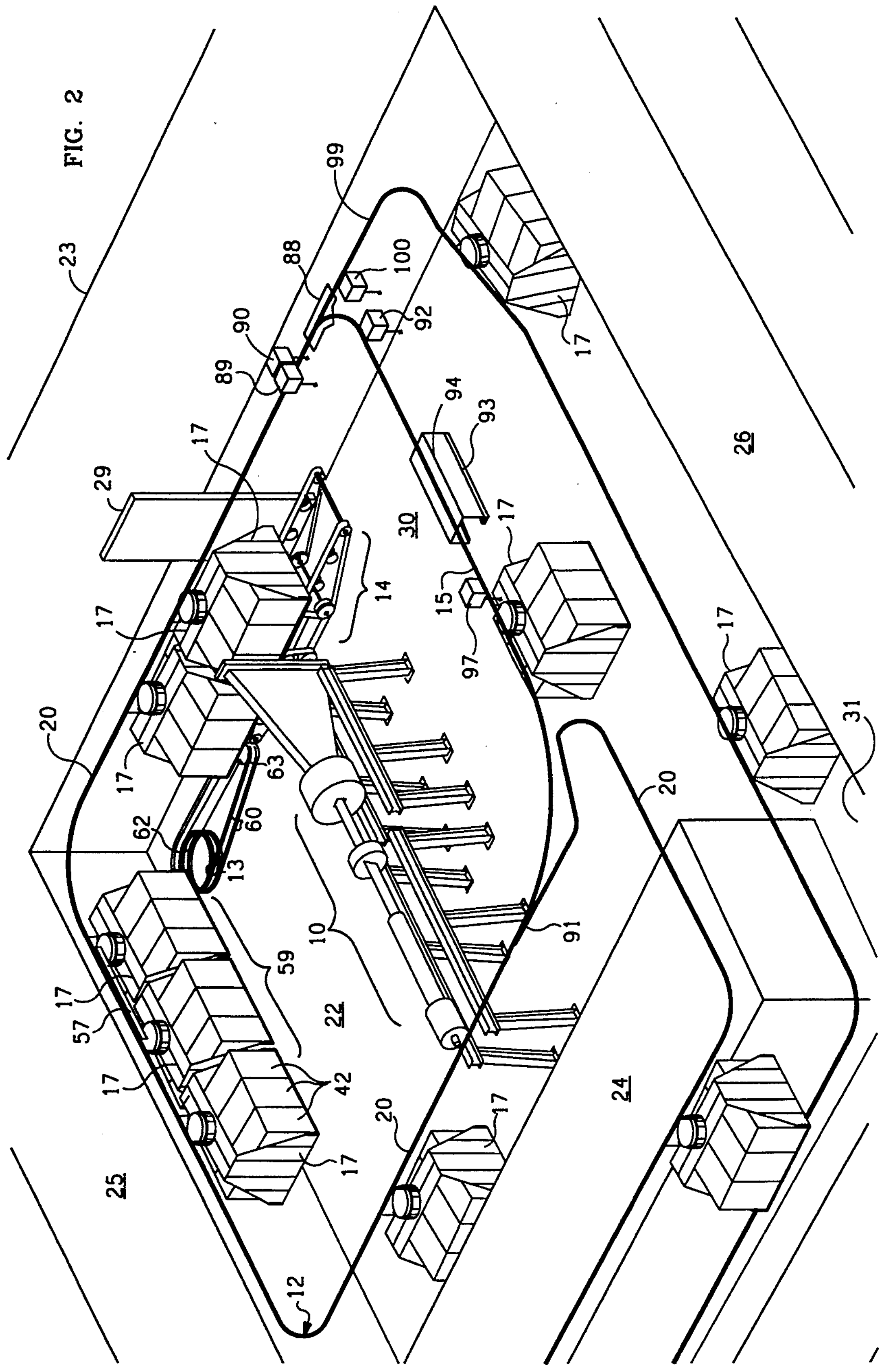
FIG. 2 illustrates a portion of the system illustrated in FIG. 1, as viewed from a different perspective.

Referring to FIGS. 1 and 2, a preferred embodiment of the radiation system of the present invention includes a radiation source 10, a conveyor system that includes an overhead transport conveyor 12, a load conveyor 13, a process conveyor 14 and a reroute conveyor 15, a plurality of article carriers 17, a system control circuit 18 and a housing 19. The system controller 18 is located outside the housing 19.

The radiation source 10 is a 10-million-electron-volt linear accelerator that provides an electron beam for irradiating articles transported past the radiation source 10 by the process conveyor 14. The radiation source 10 is disposed along an approximately horizontal axis and scans articles in the article carriers 10 being transported by the process conveyor 14 with a radiation beam that scans the transported articles at a given rate in a plane perpendicular to the direction of transport.

Figure 4:
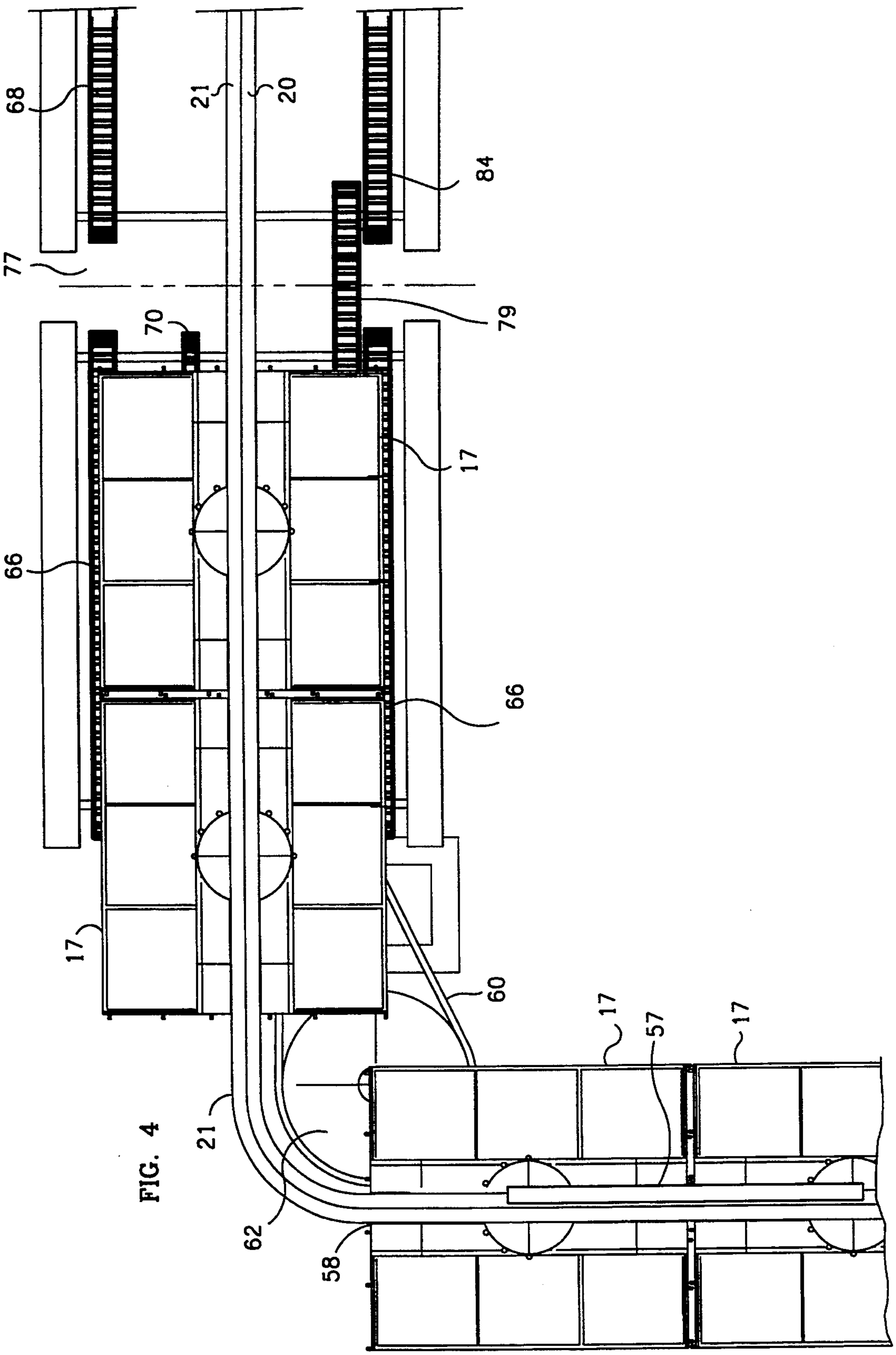
FIG. 4 is a top plan view of a number of article carriers being supported by a portion of the transport conveyor prior to transport by the load conveyor and of a number of article carriers being transported by the the process conveyor after having been transported by the load conveyor.
Figure 5B:
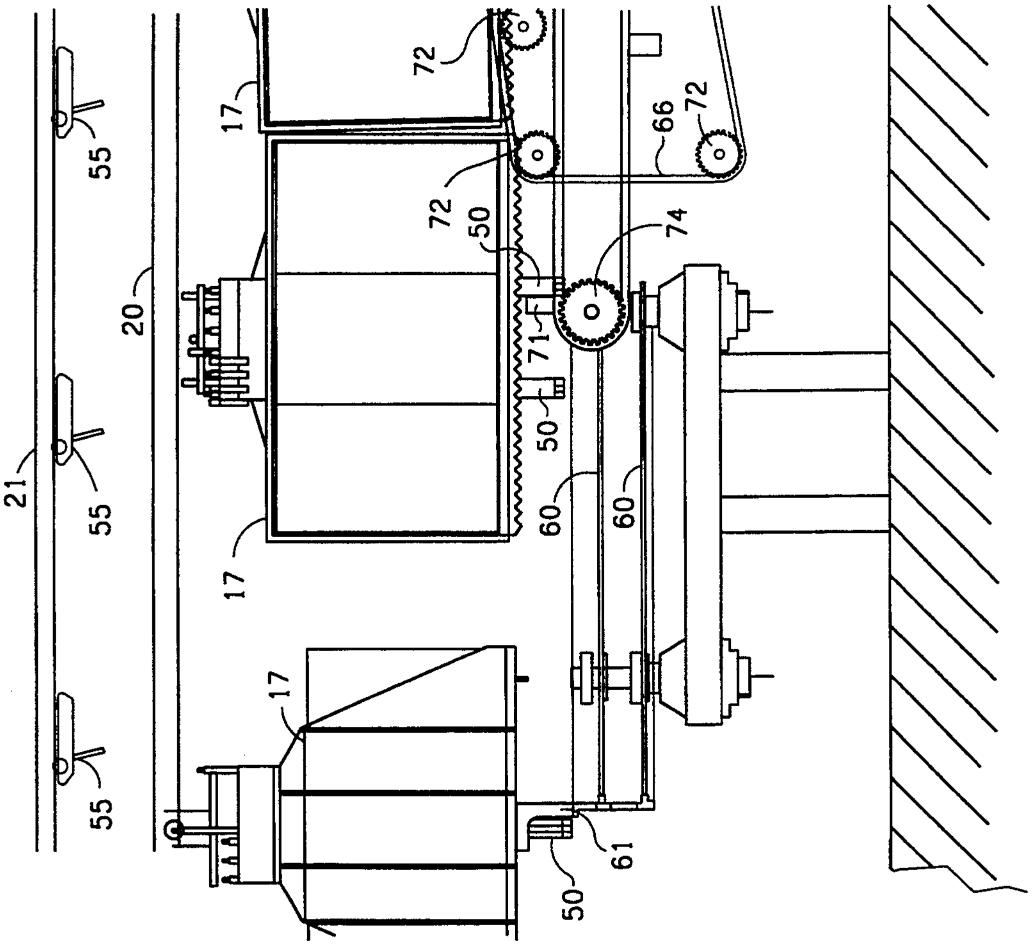
FIG. 5B is a side plan view of the load conveyor and a portion of the process conveyor shown in FIG. 4.
Figure 5A:
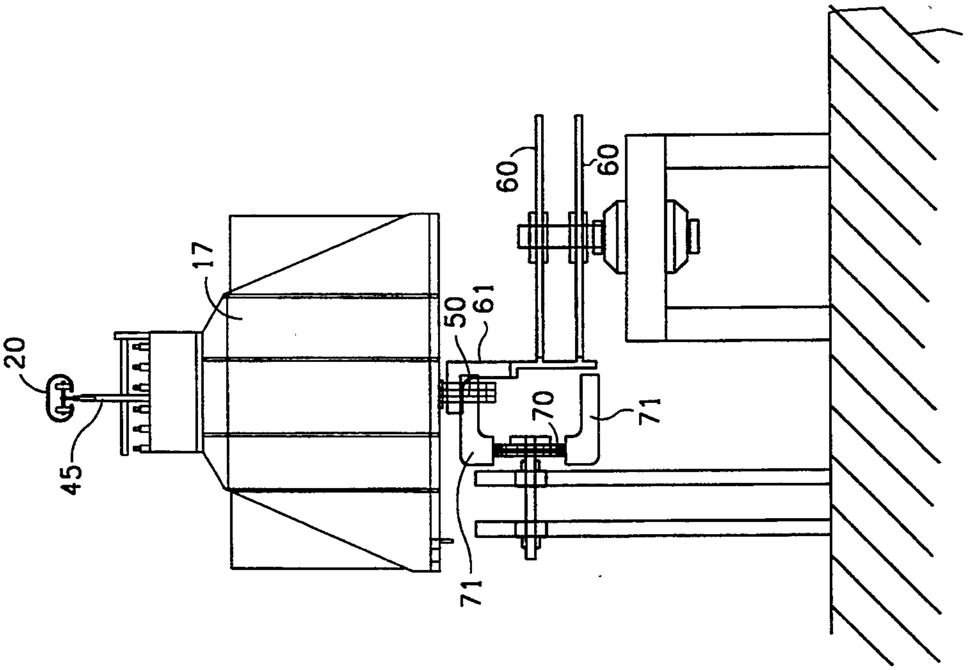
FIG. 5A is a end plan view of the load conveyor and a portion of the process conveyor shown in FIG. 4.
Figures 6A, 6B:
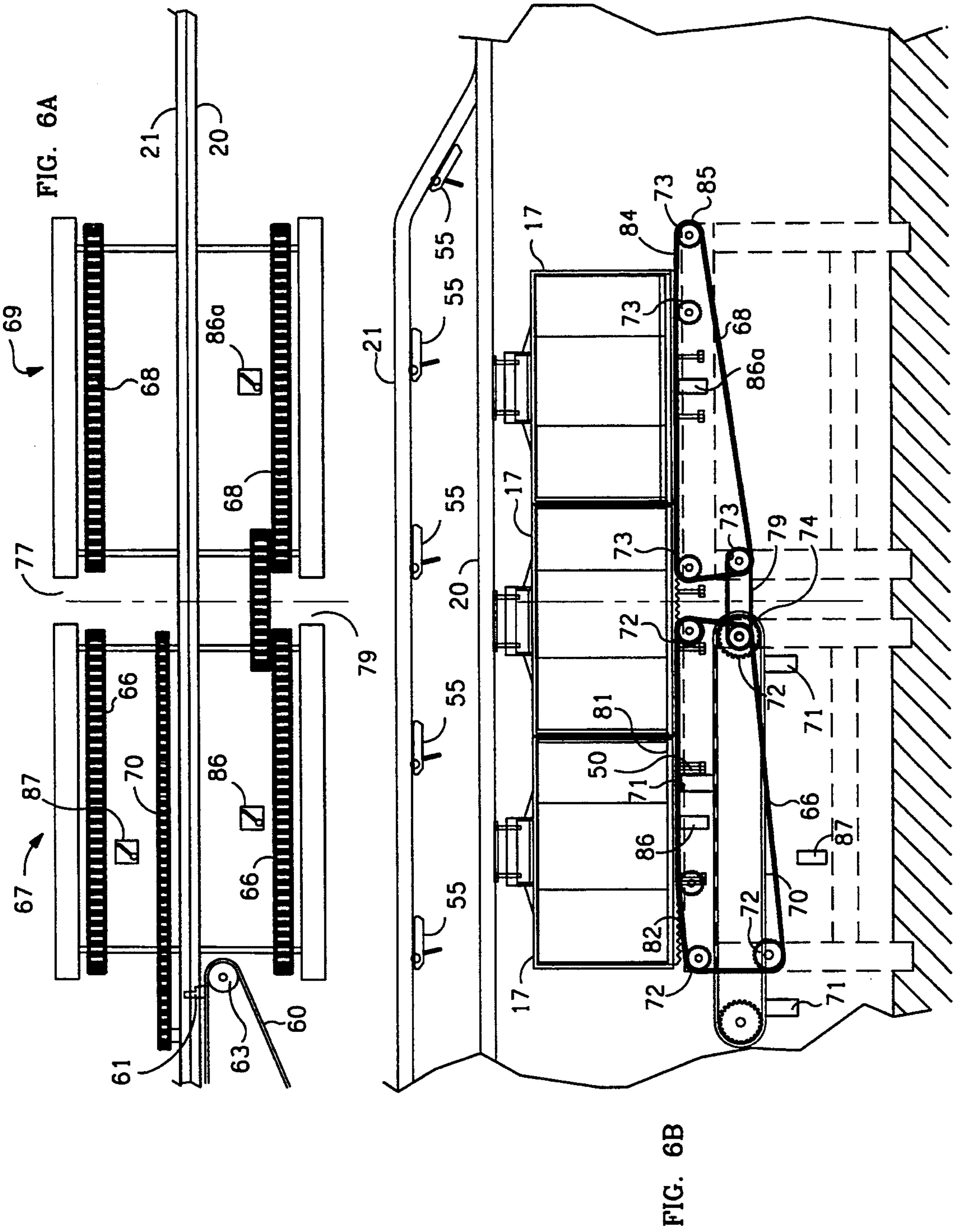
FIG. 6A is a top plan view of the process conveyor and an overlapping portion of the load conveyor included in the system illustrated in FIGS. 1 and 2.
FIG. 6B is a side plan view of the process conveyor shown in FIG. 6A with the portion of the transport conveyor disposed above the process conveyor and a number of article carriers being supported and transported by the process conveyor also being shown.

The transport conveyor 12 is an overhead power-and-free conveyor that includes a track 20 and a slotted tube 21 (FIGS. 4. 5B. 6B and 9) containing a continuously driven chain 54 with dogs 55 attached thereto disposed adjacent the track 20 except in the loading area 34 and the unloading area 98, where the track is disposed along a different path from the tube 21, and except where the track 20 passes over the load conveyor 13 and the process conveyor 14, where the tube 21 is elevated in relation to the track 20. The track 20 also is a slotted tube.

The use of a power-and-free conveyor as the transport conveyor 12 enables different article carriers 17 to be transported throughout the conveyor system at different required speeds in accordance with where in the conveyor system the article carriers 17 are being transported, because such transport in different parts of the system can either be powered by and thus at the speed of the transport conveyor 12, or free of the power of the transport conveyor and thus at a speed independent of the speed of the transport conveyor 12 while maintaining contact with the track 20 of the transport conveyor 12 so that the transport of each article carriers 17 by the transport conveyor 12 can be resumed after an interval during which the article carrier 17 is not being transported by the transport conveyor 12.

The housing 19 includes a floor 22, a ceiling (not shown) and set of walls 23, 24, 25, 26, 27, 28, all of which are made of radiation shielding material, such as reinforced concrete. A beam stop 29 is disposed on the opposite side of the process conveyor 14 from the radiation source 10. The housing 19 defines a process chamber 30 in which the radiation source 10 and a portion of the transport conveyor 12 are disposed, an entry 31 into the chamber 30 for the transport conveyor 12 and a passageway 32 for the transport conveyor 12 leading to the entry 31 into the chamber 30. Another portion of the transport conveyor 12 is located at a loading area 34 outside the set of walls 23, 24, 25, 26, 27, 28 and shielded by the set of walls 23, 24, 25, 26, 27, 28 from radiation emitted by the radiation source 10.

A first wall 23 is disposed in front of the radiation source 10 for absorbing radiatión received directly from the radiation source 10. The first wall 23 is approximately ten feet thick.

A second wall 24 is disposed behind the radiation source 10 and opposite the first wall 23 for absorbing radiation from the radiation source 10 that is reflected within the process chamber 30. The second wall 24 is approximately seven feet thick.

A third wall 25 is disposed on one side of the radiation source 10 and connects the first wall 23 and the second wall 24 for absorbing the reflected radiation. The third wall 25 is approximately seven feet thick.

A fourth wall 26 is disposed on the other side of the radiation source 10 for absorbing the reflected radiation. The fourth wall 26 is connected to the first wall 23 and is separated from the second wall 24 to define the entry 31 into the process chamber 30 for the transport conveyor 12. A fourth wall 26 is approximately seven feet thick.

A fifth wall 27 is connected to the fourth wall 26 and disposed in relation to the second wall 24 for defining the passageway 32 for the transport conveyor 12 between the second wall 24 and the fifth wall 27 and for absorbing said reflected radiation that is further reflected through the entry 31 from the process chamber 30. The fifth wall is approximately seven feet thick adjacent the entry 31 and approximately three feet thick adjacent the passageway 32.

A sixth wall 28 is connected to the second wall 24 and disposed in relation to the fifth wall 27 for defining an opening 36 into the passageway 32 for the transport conveyor 12 between the fifth wall 27 and the sixth wall 28 and for absorbing said reflected radiation that is further reflected through the passageway 32 from the process chamber 30. The sixth wall 28 is approximately one foot thick.

To minimize the size of the process chamber 30, and thus the amount of shielding material required, the transport conveyor track 20 has several 90-degree turns, including one shortly prior to where the article carriers 17 are positioned on the process conveyor 14.

Figure 3A:
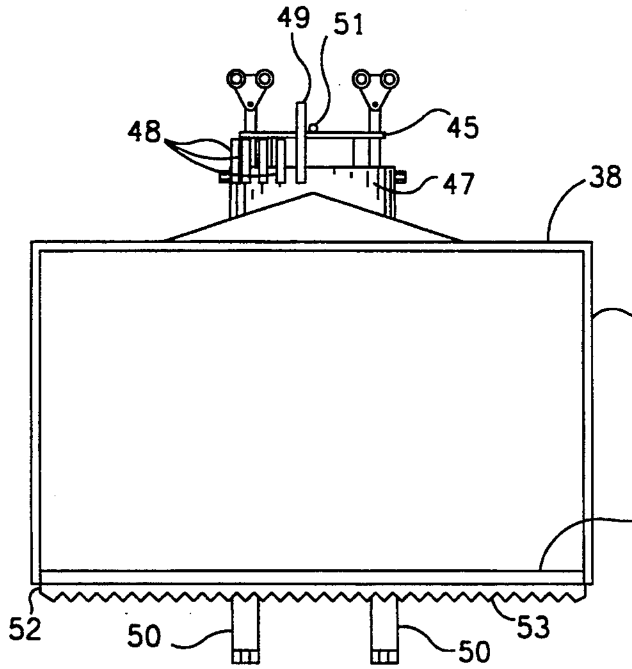
FIG. 3A is a side plan view of an article carrier included in the system illustrated in FIGS. 1 and 2.
Figure 3B:
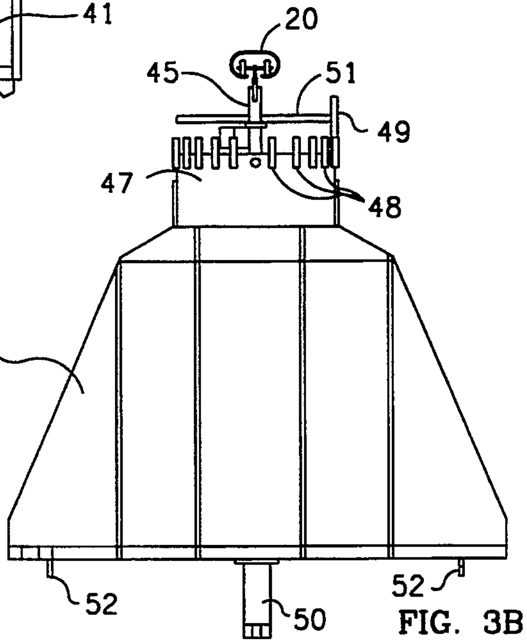
FIG. 3B is an end plan view of the article carrier of FIG. 3A supported from an overhead track.
Figure 3C:
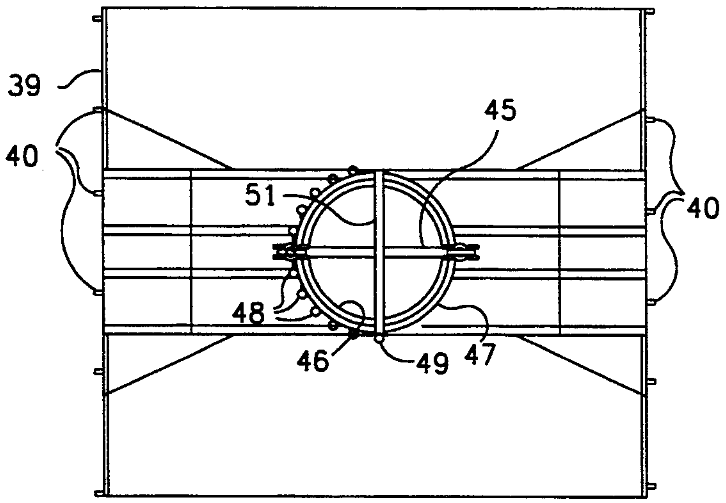
FIG. 3C is a top plan view of the article carrier of FIGS. 3A and 3B.

Referring to FIGS. 3A, 3B and 3C an individual article carrier 17 includes a top cross member 38, end members 39 as defined by the direction in which the article carrier 17 is transported by the process conveyor 14, with the end members 39 having supporting strum 40 on the outside surfaces of the end members 39, and a platform 41 for receiving the articles to be sterilized or cartons 42 containing such articles, as shown in FIGS. 1 and 2.

Individual article cartons 42 may be so dimensioned that the cross-beam exposure space within the article carrier 17 is efficiently utilized. When the articles to be sterilized are elongated, the cartons 42 are dimensioned to contain the elongated articles in such an orientation that when the article carrier 17 is transported past the radiation source 10, the elongated articles are irradiated approximately normal to the long dimension of the elongated articles to thereby achieve optimum article sterility together with optimum article throughput efficiency with respect to utilization of the energy of the radiation beam emitted by the radiation source 10 as the articles are transported past the radiation source 10.

An individual article carrier 17 further includes a trolley 45, an inner collar 46 that is non-rotatably attached to the trolley 45, an outer collar 47 that is attached to the top cross member 38 and rotatably coupled to the inner collar 46, a series of pins 48 attached to the outer collar 47, a striker tab 49 extending vertically from one side of the outer collar 47, a pair of lugs 50 extending downwardly from the platform 41 along the longitudinal axis, of the article carrier 17, a bar 51 attached to the trolley 45 and a pair of members 52 attached to the bottom of the platform 41 on opposite lateral sides of the platform 41, wherein each member 52 has a a serrated edge 53 extending downwardly from the platform 41.

The trolley 45 rides on the transport conveyor track 20 and rotatably suspends the article carrier 17 from the transport conveyor track 20.

The striker tab 49 extends vertically from one side of the article carrier 17 to enable a determination to be made as to whether or not the carrier 17 has a predetermined rotational orientation in relation to the process conveyor 14.

The respective functions of the other elements of the article carrier 17 are described later herein with reference to other components of the irradiation system with which these elements functionally cooperate.

Referring to FIG. 1, 2, 4, 5A, 5B, 6A and 6B, the process conveyor 14 supports the article carriers 17 and transports the article carriers 17 past the radiation source at a first speed; and the transport conveyor 12 transports the article carriers 17 from the loading area 34 at a second speed that differs from the first speed. In order to most efficiently utilize the energy of the radiation beam emitted by the radiation source 10, the spacing between the article carriers 17 as they are transported by the process conveyor 14 past the radiation source 10 must be as small as practically possible. To achieve consistent close spacing between the article carriers 17 as the article carriers are being transported by the process conveyor 14, the load conveyor 13 is adapted for engaging the article carriers 17 and for transporting the engaged article carriers 17 from the transport conveyor 12 to the process conveyor 14 at a speed that is varied during said transport by the load conveyor 13 in such a manner that the article carriers 17 are so positioned on the process conveyor 14 that there is a predetermined separation distance, such as one inch (2.5 cm.) between adjacent positioned article carriers 17. With one-inch spacing between article carriers 17 having a length of forty inches (100 cm.) and with end members 39 of one-half-inch thickness, the space between the interiors of adjacent positioned article carriers is approximately two inches, whereby the efficiency of radiation beam energy utilization may be as high as 95 percent.

The article carrier struts 40 are disposed differently on one end member 39 than on the other end member 39 so that the struts 40 on one article carrier 17 cannot contact the struts 40 on another article carrier 17 positioned adjacent thereto on the process conveyor 14 with the same lateral orientation as the one article carrier 17 notwithstanding the end-to-end orientation of the article carriers 17; whereby the article carriers 17 can be positioned closer together on the process conveyor 14 than would be possible if the struts 40 on one article carrier 17 could contact the struts 40 on another article carrier 17 when the article carriers 17 are positioned adjacent each other on the process conveyor 14 with the same lateral orientation.

The transport conveyor 12 further includes a movable chain 54 within the slotted tube 21 adjacent the track 20 and dogs 55 attached to the chain 54 at predetermined intervals. The chain 54 is continuously driven through the tube 21. The chain 54 is continuously driven by a drive motor 56 (FIG. 9) located outside the housing 19. Operation of the drive motor 56 is controlled by the system controller 18.

The separation distance between adjacent dogs 55 is greater than the maximum article carrier length. As the chain 54 is being driven through the track 20, a dog 55 engages the bar 51 ,attached to the trolley 45 of an article carrier 17 to thereby pull the article carrier 17 along the path of the transport conveyor track 20.

An escapement 57 is located next to the transport conveyor 12 for restraining the leading edge of an article carrier 17 at a release point 58 at the beginning of the 90-degree turn in the transport conveyor track 20 adjacent a staging area 59 from which the article carriers 17 are transported from the transport conveyor 12 by the load conveyor 13. The speed of movement of the transport conveyor chain 54 must be high enough to ensure an uninterrupted supply of article carriers 17 at the staging area 59, but not so high that the carriers 17 are damaged by contact with one another as they accumulate at the staging area 59. The escapement 57 contacts the bar 51 of the article carrier 17 to restrain further movement of the article carrier 17 with at least a predetermined restraining force until released by the escapement 57. The predetermined restraining force is large enough to cause the transport conveyor dog 55 to disengage from the trolley 45 of the restrained article carrier 17 as the continuously driven transport conveyor chain 54 moves the attached dog 55 past the staging area 59. The number of article carriers 17 being transported by the transport conveyor 12 throughout the irradiation system ideally is such in relation to the relative speeds of the transport conveyor 12 and the process conveyor 14 that the article carriers 17 accumulate behind the article carrier 17 restrained by the escapement 57. The predetermined restraining force provided by the escapement 57 also is large enough to cause the transport conveyor dogs 55 to disengage from the trolleys 45 of the accumulated article carriers 17 as the continuously driven transport conveyor chain 54 moves the attached dogs 55 past the staging area 59. The chain 54 is elevated from the track 20 between the release point 58 and the other side of the process conveyor 14 so as not to be able to again engage a trolley 45 of an article carrier 17 until the article carrier 17 has been transported past the radiation source 10 by the process conveyor 14.

The escapement 57 provides compound control of the movement of the article carriers 17. As one carrier 17 is released, the following carrier 17 is stopped by the escapement 57 until the one carrier 17 has moved beyond the escapement 57. When the escapement 57 is engaged so as to stop the next carrier 17 at the release point 58, the escapement stop for the following carrier 17 releases so the over-riding transport conveyor dog 55 can engage the trolley 45 of the following carrier to transport the following carrier 17 to the release point 58.

The load conveyor 13 includes a pair of chains 60, a latching dog 61 attached to the chains 60, a first sprocket wheel 62 and a second sprocket wheel 63 that are coupled to the chains 60 for driving the chains 60 in a horizontal plane, and a drive motor (not shown) coupled to the second sprocket wheel 63. The speed of the drive motor is controlled by a load conveyor controller 65, which is a part of the system controller 18 (FIG. 9) located outside the housing 19. The first sprocket wheel 62 has a large pitch radius which corresponds to the radius of the 90-degree turn corresponding to the 90-degree turn in the transport conveyor track 20 shortly prior to where the article carriers 17 are positioned on the process conveyor 14.

The latching dog 61 is disposed for engaging the leading lug 50 attached to the bottom of the article carrier 17. The latching dog 61 engages the leading lug 50 during both acceleration and deceleration of the article carrier 17 while the article carrier is being moved by the load conveyer 13 from the release point 58 to the process conveyor 14. The latching dog 61 disengages from the leading lug 50 when the latching dog 61 contacts a cam (not shown) before the latching dog 61 begins to move around the second sprocket wheel 63.

The overhead track 20 of the transport conveyor 12 extends over the load conveyor 13 and the process conveyor 14 and guides the transport of the article carriers 17 so that the article carriers 17 are consistently placed on the process conveyor 14 in a predetermined position in relation to the radiation source 10.

The process conveyor 14 includes a first pair of Hyvo chains 66 within a first portion 67 of the process conveyor 14, a second pair of Hyvo chains 68 within a second portion 69 of the process conveyor 14, an auxiliary chain 70, three evenly spaced dogs 71 attached to the auxiliary chain 70, a first set of sprocket wheels 72 for driving the first pair of Hyvo chains 66, a second set of sprocket wheels 73 for driving the second pair of Hyvo chains 68, third set of sprocket wheels 74 for driving the auxiliary chain 70 and a servo drive motor (not shown) coupled to one each of the sprocket wheels 72, 74, which are on a common drive shaft. The speed of the servo drive motor is controlled by a process conveyor controller 76 (FIG. 9), which is a part of the system controller 18 located outside the housing 19.

The Hyvo chains 66, 68 of the process conveyor 14 support the article carriers 17 and transport the article carriers 17 past the radiation source 10 as the Hyvo chains 66, 68 are being driven by the servo motor.

There is a gap 77 between the first portion 67 of the process conveyor 14 and the second portion 69 of the process conveyor 14. The gap 77 is located where the radiation beam emitted by the radiation source 10 scans the articles in the article carriers 17 transported past the radiation source 10 by the process conveyor 14 so that the radiation beam does not directly impinge upon the Hyvo chains 66, 68. The first process conveyor portion 67 is coupled to the second process conveyor portion 69 by another chain 79, which is driven by sprocket wheels respectively included in the first set of sprocket wheels 72 and the second set of sprocket wheels 73. The other chain 79 is located beneath the scan of the beam emitted from the radiation source 10. The first pair of Hyvo chains 66, the second pair of Hyvo chains 68, the auxiliary chain 70 and the other chain 79 are all driven at the same speed in response to power provided by the servo motor to one of the sprocket wheels 72 of the first set.

After the load conveyor 13 initially positions the leading edge of an article carrier 17 onto the first portion 67 of the process conveyor 14, one of the three dogs 71 attached to the auxiliary chain 70 engages the trailing side of the leading lug 50 on the bottom of the carrier 17 just before the latching dog 61 of the transport conveyor moves around the second sprocket wheel 63 and disengages from the leading carrier lug 50.

The first process conveyor portion 67 includes a level section 81, within which the article carriers 17 are supported by the first pair of Hyvo chains 66 while being transported to and past the radiation source 10 by movement of the first pair of Hyvo chains 66, and an upwardly inclined section 82 onto which the article carriers 17 transported by the load conveyor 13 are positioned on the process conveyor 14 so that the article carriers 17 are elevated as they are positioned on the process conveyor 14 so that the article carriers 17 are not supported by the overhead transport conveyor 12 while being transported by the process conveyor 14.

The auxiliary chain dog 71 continues to engage the the leading lug 50 on the bottom of the carrier 17 in order to transport the article carrier at the speed of the process conveyor 14 until the carrier is fully supported by the Hyvo chains 66 of the first process conveyor portion 67. The dog 71 disengages from the leading lug 50 when it is turned away from the leading lug 50 by downward movement of the auxiliary chain 70 adjacent the gap 77.

The gap 77 is of such relatively small breadth that support and transport of the article carrier 17 is transferred from the first process conveyor portion 67 to the second process conveyor portion 69 as the article carrier 17 is being transported past the radiation source 10.

The second process conveyor portion 69 includes a level section 84, within which the article carriers 17 are supported by the second pair of Hyvo chains 68 while being transported past and from the radiation source 10 by movement of the second pair of Hyvo chains 66. As an article carrier 17 leaves the the second process conveyor section 69, the article carrier 17 is again supported by the track 20 of the overhead transport conveyor 12.

Above the discharge end 85 of the second process conveyor section 69, the chain 54 of the transport conveyor 12 descends to the same level as the track 20 of the transport conveyor 12 so that an article carrier 17 leaving the second process conveyor section 69 can be engaged by a transport conveyor dog 55 attached to the chain 54. When the article carrier 17 leaving the second process conveyor section 69 is engaged by a transport conveyor dog 55, the so engaged article carrier 17 is transported from the process conveyor 14 at a speed that is greater than the process conveyor speed.

The speed of process conveyor 14 is adjustable over a relatively large range in order to subject the articles carried by the article carriers 17 to a prescribed radiation dosage within a range of radiation dosages. In all cases, the speed of the transport conveyor chain 54 exceeds the speed of the process conveyor 14. In the preferred embodiment the speed of movement of the transport conveyor chain 54 is a constant.

The process conveyor controller 76 controls the servo drive motor for the process conveyor 14 by internal data processing based on quadrature format encoder counts. The controller 76 uses a proportional integrated differential (PID) loop in order to reduce the difference between a predetermined speed that is proportional to selected process conveyer drive speed and the actual servo motor armature speed (as indicated by the encoder counts) to be as close to zero as possible. By selecting an encoder with sufficient resolution and programmable error tolerances, drive speed errors are held within prescribed limits.

The system controller 18 monitors the accuracy of the speed control achieved by the PID loop by passing the process conveyor drive encoder speed output of the process conveyor controller 76 to a programmable logic controller (PLC), which at each control cycle update period compares this value to a set point speed commanded by the PLC program. This method verifies that the PLC instructed speed value is being achieved. Should the monitored speed fall outside a predetermined range, the system controller 18 turns off all of the conveyors 12, 13, 14, 15 and the radiation source 10 to interrupt transport of the article carrier 17 past the radiation source 10 by the process conveyor 14 and to interrupt the emission of radiation by the radiation source 10.

The system controller 18 also continuously measures the actual speed at which the article carrier 17 is being transported past the radiation source 10. Such article transport speed may differ from the process conveyor speed if there is slippage between the article carrier 17 and the process conveyor 14 and/or if movement of the carrier 17 is impeded by extraneous means. Limit switches 86 and **86*a* are disposed respectively adjacent one the Hyvo chains 66, 68 in each portion 67, 69 of the process conveyor 14 so as to contact the serrated edge 53 on the member 52 extending from the article carrier on the side of the process conveyor 14 on which the limit switches 86, 86*a* are located and to be periodically operated by such contact with the serrated edge 53 as the article carrier 17 is being transported by the process conveyor 14 past the radiation source 10. The system controller 18 measures the frequency of said operation of the limit switches 86, 86***a* and turns off all of the conveyors 12, 13, 14, 15 and the radiation source 10 when the measured frequency is outside a predetermined frequency range such that the speed at which the article carrier 17 is being transported is outside of a given speed range.

Once the condition that caused either the monitored speed of the process conveyor drive motor or the measured frequency of operation of either of the limit switch 86, 86*a* to be outside their respective predetermined ranges has been identified and alleviated, operation of all of the conveyors 12, 13, 14, 15 and operation of the radiation source 10 are resumed. Upon such resumption, the process conveyor controller 76 controls the acceleration and speed of transport by the process conveyor servo drive motor in relation to a given scanning energy level rise rate and a given width of the radiation beam In the direction of transport such that the portion of the article being scanned upon said interruption of radiation and transport is scanned with a total pre-and-post-interruption radiation dosage within a prescribed dosage range.

Once an article carrier 17 is positioned on the process conveyor 14 and being transported past the radiation source 10, contact by a following carrier 17 is not allowed because such contact would affect the uniform motion of the carrier 17 past the radiation source 10. The load conveyor controller 65 controls the acceleration and speed of the load conveyor 13 to prevent contact between the article carriers 17 as they are positioned on the process conveyor 14 such that there is a predetermined distance between adjacent positioned article carriers 17.

A characteristic curve of the speed of the load conveyor 13 as a function of time is shown in FIG. 7A.

A characteristic curve of the distance over which each article carrier 17 is transported by the load conveyor 13 as a function of time is shown in FIG. 7B, which has the same time scale as FIG. 7A.

Referring to FIG. 7A, the load conveyor 13 begins movement from the release point 58 at a time $t_o$, by being accelerated at an acceleration rate $A_R$ for a period of time $T_R$ to a speed $S_L$ that is greater than the speed $S_P$ of the process conveyor 14. The load conveyor 13 then transports the article carrier 17 at the speed $S_L$ for a variable period of time $T_V$ until a time $t_D$, when the load conveyor 13 begins to decelerate at a rate of deceleration $A_M$ for a variable period of time $T_M$ which ends at a total elapsed time $T_L$ from the time $t_o$ when the speed of the load conveyor 13 matches the speed $S_P$ of the process conveyor 14 whereupon the leading edge of the article carrier 17 is placed on the upwardly inclined section 82 of the process conveyor 14.

Referring to FIG. 7B, the distance $X_L$ over which each article carrier 17 is transported by the load conveyor 13 during the time period $T_L$ is a constant in accordance with the dimensions of the load conveyor 13.

Referring again to FIG. 7A, although the speed $S_P$ of the process conveyor 14 may be adjusted from time to time in accordance with the radiation dosage requirements for the particular articles being transported past the radiation source, in the preferred embodiment of the present invention, the total elapsed time $T_L$ over which the load conveyor 13 transports an article carrier 17 from the release point 58 to the process conveyor 14 is constant, notwithstanding the speed $S_P$ of the process conveyor 14. Also, in the preferred embodiment, the acceleration rate $A_R$, the acceleration time period $T_R$, the load conveyor speed $S_L$ during the period $T_V$ between acceleration and deceleration, and the deceleration rate $A_M$ all are constants for all process conveyor speeds $S_P$.

Therefore, in the preferred embodiment, the time $t_D$, at which the load conveyor 13 begins to decelerate is earlier when the speed $S_P$ of the process conveyor 14 is slower.

The total elapsed time $T_L$ from the time $t_o$ until the speed of the load conveyor 13 matches the speed $S_P$ of the process conveyor 14 is equal to the sum of the acceleration time period $T_R$, the variable time period $T_V$ and the variable deceleration time period $T_M$.

$$T_L = T_R + T_V + T_M, \quad (1)$$

wherein $$T_V = \frac{X_L - S_L^2/2A_R - (S_L^2 - S_P^2)/2A_M}{S_L}; \quad \text{(Eq. 2)}$$

and $$T_M = \frac{S_L - S_P}{A_M}. \quad \text{(Eq. 3)}$$

The time interval $T_I$ between the beginning of transport of successive article carriers 17 by the transport conveyor 13 is determined in accordance with the length $L_C$ of the article carrier 17, the predetermined separation distance $L_S$ between successive article carriers 17 while being transported by the process conveyor 14 past the radiation source 10, and the speed $S_P$ of the process conveyor 14.

$$T_I = \frac{L_C + L_S}{S_P} \quad \text{(Eq. 4)}$$

To prevent interference between the carrier 17 that is released onto the load conveyor 13 and the following carrier 17, there must be a time delay $T_D$ before the following carrier 17 can be released.

The time interval $T_I$ must be greater than the sum of the carrier release time delay $T_D$ plus the time period $T_p$ for the next carrier 17 to advance to the release point 58 plus the time period $T_G$ for the transport conveyor dog 55 to travel a distance equal to the spacing distance $X_G$ between the dogs 55 on the chain 54.

$$T_I > T_D + T_p + T_G \quad (5)$$

The time period $T_p$ is dependent upon the length $L_C$ of the article carrier 17 and the speed $S_T$ of movement of the transport conveyor dogs 55.

$$T_P = \frac{L_C}{S_T} \quad \text{(Eq. 6)}$$

The time period $T_G$ is dependent upon the spacing distance $X_G$ between the transport conveyor dogs 55 and the speed $S_T$ of movement of the transport dogs 55.

$$T_G = \frac{X_G}{S_T} \quad \text{(Eq. 7)}$$

In order to obtain the predetermined separation distance $L_S$ between successive article carriers 17 on the process conveyor 14, the time interval $T_I$ must also be greater than the total time $T_L$ over which the load conveyor 13 transports the article carrier 17 plus the time $T_G$ required for a transport conveyor dog 55 to travel the dog spacing distance $X_G$.

$$T_I > T_L + T_G \quad (8)$$

The time $t_D$ at which deceleration by the load conveyor 13 begins is the sum of the acceleration time period $T_R$ plus the variable time period $T_V$ of constant load conveyor speed $S_L$.

$$t_D = T_R + T_V \quad (9)$$

The minimum time $t_{DMIN}$ at which deceleration by the load conveyor 13 can begin must be greater than the time interval $T_C$ beginning at the release time $t_o$ required for an article carrier 17 to travel such a distance $X_C$ as to be sufficiently clear of the next released carrier 17 as to prevent contact between the successively transported carriers 17. The distance $X_C$ is determined by the geometrical dimensions of the articles carriers 17 and the path traveled by the article carriers 17 from the release point 58 around the 90-degree turn and then straight to the process conveyor 14.

$$t_{DMIN} = T_R + T_{VMIN} > T_C, \quad (10)$$

wherein $t_{DMIN}$ a is dependent upon the minimum process conveyor speed $S_{PMIN}$, $$T_{VMIN} = \frac{X_L - S_L^2/2A_R - (S_L^2 - S_{PMIN}^2)/2A_M}{S_L}; \quad \text{(Eq. 11)}$$

and $$T_C = \frac{X_C}{S_L} + \frac{S_L}{2A_R}. \quad \text{(Eq. 12)}$$

In the preferred embodiment, the clearance distance $X_C$ is considerably larger than the length $L_C$ of the article carder 17 because of the movement of the article carriers 17 around a 90-degree turn, as described above.

In alternative preferred embodiments, one or more of the total time $T_L$ over which the load conveyor 13 transports an article carrier 17 from the release point 58 to the process conveyor 14, the acceleration rate $A_R$, the acceleration time period $T_R$, the load conveyor speed $S_L$ during the period $T_V$ between acceleration and deceleration, and the deceleration rate $A_M$ may be adjusted for different process conveyor speeds $S_P$.

The load conveyor controller 65 is programmed to establish the acceleration $A_R$ and the deceleration $A_M$ as functions of time. By maintaining the acceleration rate $A_R$, the acceleration time period $T_R$, the load conveyor speed $S_L$ during the period $T_V$ between acceleration and deceleration, and the deceleration rate $A_M$ as constants for all process conveyor speeds $S_P$, programming of the load conveyor controller 65 is simplified.

The load conveyor controller 65 and the process conveyor controller 76 each have a finite encoder count capacity which requires that the count be initialized periodically to avoid overflowing the count register. For the load conveyor controller 65 and the the process conveyor controller 76, initialization occurs when an auxiliary chain dog 71 contacts and thereby operates a limit switch 87 during each carrier movement cycle. This method of periodic encoder count initialization maintains system accuracy by eliminating accumulated count errors which would produce positional drift and adversely affect system reliability.

During operation, the point in time when the load conveyor 13 begins to transport an article carrier from the release point 58 is determined by subtracting a calculated time value $T_Q$ from the overall time interval $T_I$. The time value $T_Q$ is determined by the geometrical dimensions of the load conveyor 13 and the process conveyor 14 and the location of the limit switch 87 that is operated by the auxiliary chain dog 71.

With the radiation source 10 being disposed along an approximately horizontal axis, the disposition of the process conveyor 14 in relation to the radiation source 10 is such that articles carried by article carriers 17 having a first horizontal orientation receive radiation impinging upon a first side of the articles.

The reroute conveyor 15 branches from the transport conveyor 12 at a track switch 88 located beyond the process conveyor 14 and transports those article carriers 17 carrying articles that have received radiation impinging upon only the first side of the articles.

Operation of the track switch 88 occurs in response to operation of one or the other of a pair of limit switches 89, 90, which are mounted in stationary positions on opposite sides of the transport conveyor track 20 between the process conveyor 14 and the track switch 88 for detecting whether or not an article carrier 17 transported from the process conveyor 14 has been reoriented. One or the other of the limit switches 88, 89 is operated by contact with the striker tab 49 extending vertically from one side of the outer collar 47 of the carrier 17 after the carrier 17 has been transported past the radiation source 10 by the process conveyor 14.

When the article carrier 17 that has Just been transported past the radiation source 10 is oriented such that the radiation impinged on the first side of the articles in the article earlier 17, the striker tab 49 is on the same side of the transport conveyor 12 as the limit switch 90, whereupon the striker tab 49 contacts the limit switch 90 as the carrier is being transported past the limit switch 90 to operate the limit switch 90 to cause the track switch 88 to be so operated as to route the article carrier 17 onto the reroute conveyor 15.

The reroute conveyor 15 also is an overhead power and free conveyor, which includes a track extending from the track switch 88 to a passive merge junction 91, from which track the article carriers 17 are suspended during transport, and a chain with dogs attached thereto disposed to one side of the reroute conveyor track so that such dogs can engage the bar 51 attached to the trolley 45 of an article carrier 17 to thereby push the article carrier 17 along the path of the reroute conveyor track. The reroute conveyor chain (not shown) is coupled by gears (not shown) to the transport conveyor chain 54 and is thereby driven at the same speed at the transport conveyor chain 54.

Article carriers 17 transported by the reroute conveyor 15 are reoriented about a vertical axis by 180 degrees and transferred back onto the transport conveyor 12 at the passive merge junction 91 prior to the staging area 59 for retransportation by the transport conveyor 12 and the load conveyor 13 to the process conveyor 14 and for retransportation past the radiation source 10 by the process conveyor 14 so that a second side of the carried articles opposite to the first side receives impinging radiation from the radiation source 10.

Figure 8A:
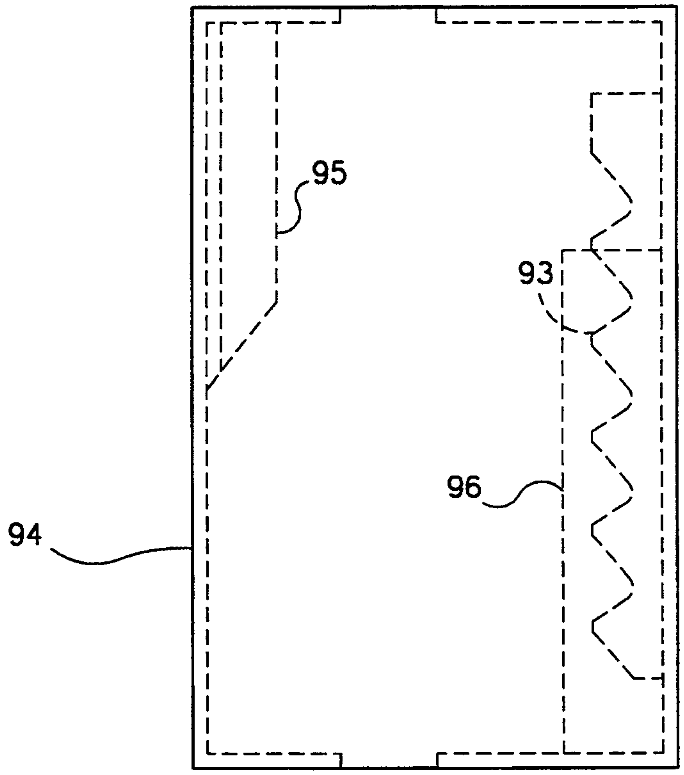
FIG. 8A is a top plan view of a gear rack mounted adjacent an reroute conveyor in the conveyor system illustrated in FIG. 1 for engagement with the article carrier to rotationally reorient the article carrier, with internal portions of the rack being shown by dashed lines.
Figure 8B:
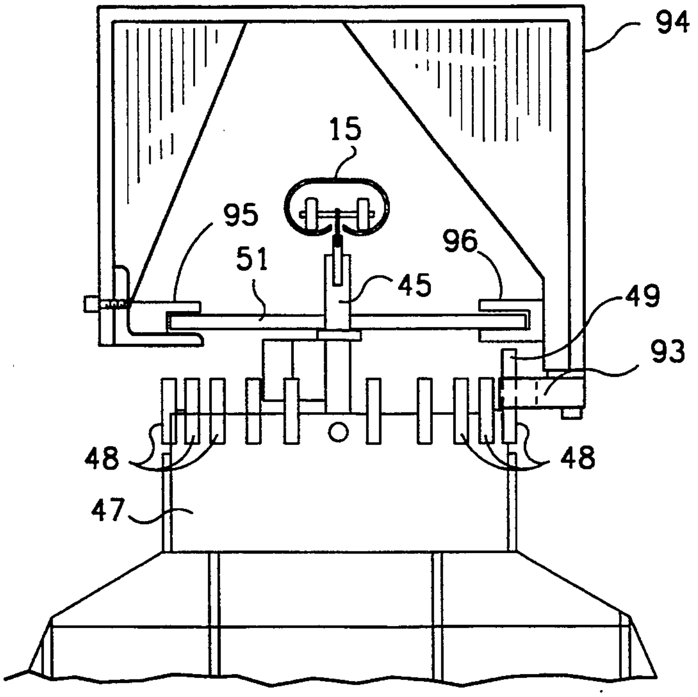
FIG. 8B is an end plan view of the gear rack shown in FIG. 8A in combination with an article carrier supported from an overhead track with only the top portion of the article carrier being shown.

The article carrier 17 is constructed to rotate so that it can be reoriented about a vertical axis by sequential engagement with a gear rack 93 disposed adjacent the reroute conveyor 15. Referring to FIGS. 8A and 8B, the gear rack 93 is supported by a framework 94.

As indicated above, the trolley 45 rides on the transport conveyor track 20 and is coupled to the article carrier top cross member 38 in such a manner as to rotatably suspend the article carrier 17 from the conveyor track 20. The inner collar 46 is non-rotatably attached to the trolley 45; and the outer collar 47 is non-rotatably attached to the top cross member 38 at the top of the article carrier 17. The outer collar 47 is rotatable in relation to the inner collar 46 and thereby is rotatable in relation to the trolley 45 so that the article carrier 17 is rotatable in relation to the reroute conveyor 15.

The series of pins 48 attached to the outer collar 47 are vertically oriented when the article carrier 17 is suspended from the reroute conveyor 15 and are thereby disposed to sequentially engage the teeth of the gear rack 93, which is mounted in a stationary position in relation to the track of the reroute conveyor track 15, such that as the article carrier 17 is being transported by the reroute conveyor 15, the pins 48 are sequentially engaged by the gear rack 93 to rotate the article carrier 17. The interaction between the pins 48 and the gear rack 93 rotates the article carrier by 180 degrees.

A guide mechanism including bearings and detents couple the inner collar 46 to the outer collar 47 in order to maintain the rotational orientation of the article carrier 17 when the carrier 17 is not being rotated by the engagement of the pins 48 with the gear rack 93.

Also supported within the framework 94 are a first slotted member 95 laterally disposed on the opposite side of the framework 94 from the gear rack 93 adjacent the entrance end of the framework 94 and a second slotted member 96 laterally disposed on the same side of the framework 94 as the gear rack 93, adjacent the exit end of the framework 94, but below the the gear rack 93. These two slotted members 95, 96 are disposed at the height of the bar 51 of an article carrier 17 supported from the reroute conveyor track 15 within the framework 94 so as to provide restraint against lateral movement of the article carrier 17 as the article carrier 17 is being rotated by the interaction between the pins 48 and the gear rack 93 as the article carrier is being transported along the reroute conveyor track 15.

A limit switch 92 is mounted in a stationary position between the gear rack 93 and the track switch 88 for detecting the presence of an article carrier 17 on the reroute track 15. The limit switch 92 is disposed in relation to the reroute conveyor track 15 so that it is operated by contact with the striker tab 49 extending vertically from one side the outer collar 47 of the article carrier 17.

Another limit switch 97 is mounted in a stationary position in relation to the reroute conveyor 15 between the gear rack 93 and the merge junction 91 for detecting whether or not an article carrier 17 transported onto the reroute conveyor 15 from the process conveyor 14 has been reoriented 180 degrees by the gear rack 93. If the carrier 17 has been rotated 90 degrees about a vertical axis by the gear rack 93, the limit switch 97 is operated by contact with the striker tab 49 extending vertically from one side the outer collar 47 of the carrier 17.

The limit switches 92 and 97 are connected to the system controller 18; and when the correct orientation of an article carrier 17 is not detected by operation of the limit switch 97 within a predetermined time window following operation of the limit switch 92, the system controller 18 responds by interrupting both radiation from the radiation source 10 and transport of all of the article carriers 17 by all of the conveyors 12, 13, 14, 15 of the conveyor system. After the article carrier 17 has been correctly oriented, operation of all of the conveyors 12, 13, 14, 15 and operation of the radiation source 10 are resumed, as described above.

When the article carrier 17 that has Just been transported past the radiation source 10 is oriented such that the radiation impinged on the second side of the articles in the article carrier 17, the striker tab 49 is on the same side of the transport conveyor 12 as the limit switch 89, whereupon the striker tab 49 contacts the limit switch 89 as the carrier is being transported past the limit switch 89 to operate the limit switch 89 to cause the hack switch 88 to be so operated as to route the article carrier 17 onto an extended portion 99 of the transport conveyor 12 for transportation to an unloading area 98.

Another limit switch 100 is mounted in a stationary position on the same side of the transport conveyor track 20 as the limit switch 89 and adjacent the extended portion 99 of the transport conveyor 12 for detecting when the article carrier 17 that has just been transported past the radiation source 10 is oriented such that the radiation impinged on the second side of the articles in the article carrier 17, which indicates proper operation of the track switch 88. The limit switch 100 is operated by contact with the striker tab 49 that extends vertically from the one side of the outer collar 47 of the carrier 17 when the carrier 17 that has Just been transported past the radiation source 10 by the process conveyor 14 is correctly routed by the track switch 88.

If the limit switch 100 is not operated within a predetermined time window following operation of the limit switch 89, a malfunction of the track switch 88 is detected.

The limit switch 1 00 is connected to the system controller 18; and if the limit switch 1 00 is not operated within a predetermined time window following operation of the limit switch 89, a malfunction of the track switch 88 is detected by the system controller 18. When a malfunction of the track switch 88 is so detected, the system controller 18 responds by interrupting both radiation from the radiation source 10 and transport of all of the article carriers 17 by all of the conveyors 12, 13, 14, 15 of the conveyor system. After the article carrier 17 has been correctly oriented, operation of all of the conveyors 12, 13, 14, 15 and operation of the radiation source 10 are resumed.

In the loading area 34, a mask 102 is mounted in a stationary position in relation to the transport conveyor 12 for blocking passage of an article carrier 17 that does not have the striker tab 49 on the side of the article carrier 17 that will receive impinging radiation from the radiation source 10 when the article carrier 17 is first transported past the radiation source 10. The mask 102 has an opening that permits passage of the article carrier 17 only when the striker tab 49 is on such side of the article carrier 17.

Within the entry 31 to the process chamber 30 and the passageway 32, the portion of the transport conveyor 12 that transports the article carriers 17 from the loading area 34 to the process chamber 30 is elevated with respect to the extended portion 99 of the transport conveyor 12 that transports the article carriers from the process conveyor 14 to the unloading area 98.

Figure 9:
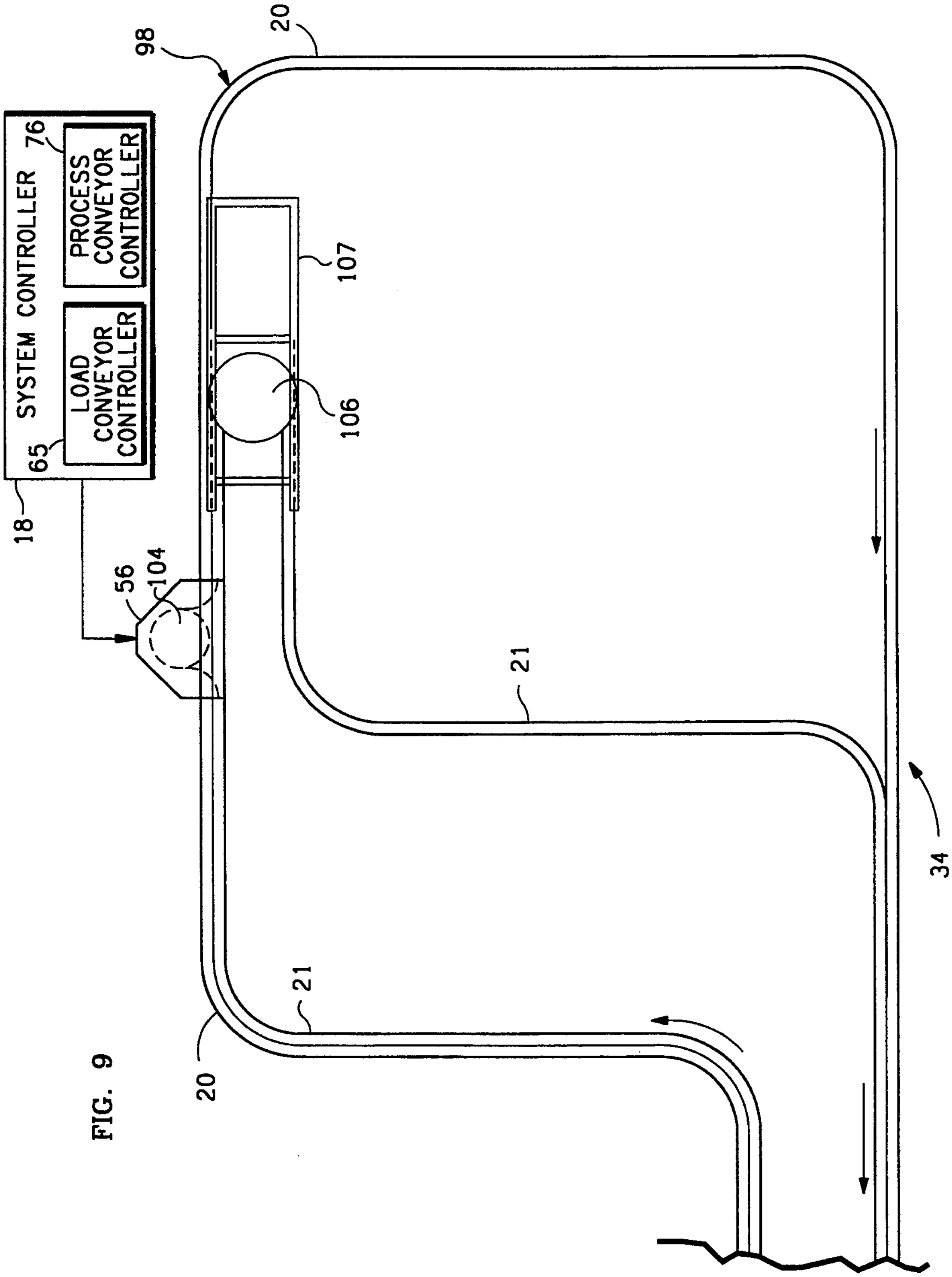
FIG. 9 is a diagram of the tubes of the power-and-free overhead transport conveyor in the loading and unloading area for the conveyor system illustrated in FIGS. 1 and 2 together with the system controller and the chain drive and tensioning chain means for the powered portion of the transport conveyor.

Referring to FIG. 9, the transport conveyor chain within the slotted tube 21 is driven by a sprocket wheel 104 coupled to the drive motor 56 and passes around an idler sprocket wheel 106 coupled to a chain tensioning device 107. The track tube 20 takes a separate route from the slotted tube 21 within the unloading area 98 and the loading area 34 so that the article carriers can be manually stopped and unloaded. The article carriers 17 are then pushed manually along the route of the track 20 to the loading area 34 where they are loaded with a new set of articles to be irradiated. Beyond the loading area 34 the tracks 20 and 21 merge to be adjacent each other so as to enable the transport conveyor 12 to transport the article carriers 17 into the process chamber 30.

We claim:

1. An article irradiation system, comprising a radiation source;

a plurality of article carriers;

a process conveyor for supporting and transporting the article carriers past the radiation source at a first speed;

a transport conveyor for transporting the article carriers from a loading area at a second speed that differs from said first speed; and a load conveyor for engaging the article carriers and for transporting the engaged article carriers from the transport conveyor to the process conveyor at a speed that is varied during said transport by the load conveyor in such a manner that the article carriers are so positioned on the process conveyor that there is a predetermined separation distance between adjacent positioned article carriers.

2. A system according to claim 1, wherein the article carriers have a maximum length and the transport conveyor is an overhead power-and-free conveyor, including a movable chain and dogs that are attached to the chain at intervals greater than the maximum article carrier length for engaging the article carrier to transport the article carriers, wherein a said dog is disengaged from a said article carrier when the said article carrier is restrained from movement by at least a predetermined restraining force, the system further comprising an escapement located next to the transport conveyor for restraining said article carriers with at least said predetermined restraining force at a release point from which a said article carrier is transported from the transport conveyor by the load conveyor; and a controller coupled to the load conveyor for causing the load conveyor to engage the said restrained article carrier for transport by the load conveyor and to override the restraint applied by the escapement at a release time that results in the said article carrier being positioned on the process conveyor at the predetermined separation distance from another said article carrier next previously positioned on the process conveyor after the load conveyor transports the said article carrier from the transport conveyor to the process conveyor at said varied speed.

3. A system according to claim 2, wherein the controller causes the load conveyor to transport the article carrier at the same speed as the process conveyor when the load conveyor positions the article carrier on the process conveyor.

4. A system according to claim 1, wherein the controller causes the load conveyor to transport the article carrier at the same speed as the process conveyor when the load conveyor positions the article carrier on the process conveyor.

5. A system according to claim 1, wherein the transport conveyor is an overhead power-and-free conveyor that maintains contact with the article carriers as the article carriers are being transported past the radiation source by the process conveyor at a speed independent of the speed of the transport conveyor, and that transports the article earners away from the process conveyor after the article carriers are transported past the radiation source.

6. A system according to claim 5, wherein the process conveyor includes a level section, which supports the article carriers while the article carriers are being transported past the radiation source and an upwardly inclined section onto which the article carriers transported by the load conveyor are positioned on the process conveyor so that the article carriers are elevated as they are positioned on the process conveyor so that the article carriers are not supported by the overhead transport conveyor while being transported by the process conveyor past the radiation source.

7. A system according to claim 6, wherein the transport conveyor supports the article carriers as the article carriers leave the process conveyor.

8. A system according to claim 7, wherein the transport conveyor includes a movable chain and dogs that are attached to the chain for engaging the article carriers to transport the article carriers; and wherein when a said supported article carrier is engaged by a said dog as said supported article carrier leaves the process conveyor, said engaged supported article carrier is transported from the process conveyor at a speed that is greater than the process conveyor speed.

9. A system according to claim 1, wherein each carrier includes end members as defined by the direction in which the article carriers are transported by the process conveyor, with the end members having supporting struts disposed on the outside of said end members; and wherein the struts are disposed differently on one end member than on the other end member so that the struts on one said article carrier cannot contact the struts on another said article carrier positioned adjacent thereto on the process conveyor with the same lateral orientation as the one said article carrier notwithstanding the end-to-end orientation of the article carriers, whereby the article carriers can be positioned closer together on the process conveyor than would be possible if the struts on one said article carrier could contact the struts on another said article carrier when said article carriers are positioned adjacent each other on the process conveyor with said same lateral orientation.

10. An article irradiation system, comprising a radiation source;

a plurality of article carriers; and a process conveyor for transporting the article carriers past the radiation source;

wherein the radiation source is disposed along an approximately horizontal axis and the process conveyor is disposed in relation to the radiation source such that articles carried by article carriers having a first horizontal orientation receive radiation impinging upon a first side of the articles;

the system further comprising a reroute conveyor coupled to the process conveyor for transporting said article carriers carrying articles that have received radiation impinging upon only the first side of the articles;

passive means disposed adjacent the reroute conveyor for reorienting the article carriers about a vertical axis by 180 degrees as the article carriers are being transported by the reroute conveyor; and means for transporting the reoriented article carriers from the reroute conveyor to the process conveyor for retransportation past the radiation source by the process conveyor so that a second side of said carried articles opposite to said first side receives impinging radiation from the radiation source.

11. A system according to claim 10, wherein the reroute conveyor is an overhead conveyor having a track;

wherein the article carrier comprises a trolley that rides on the conveyor track and is coupled to the article carrier in such a manner as to rotatably suspend the article carrier from the conveyor;

a collar attached to the top of the article carrier, wherein the collar is rotatable in relation to the trolley and non-rotatable in relation to the article carrier; and a series of pins attached to the collar, which pins are vertically oriented when the article carrier is suspended from the conveyor; and wherein the passive reorienting means comprises a gear rack mounted in a stationary position in relation to the conveyor track such that as the article carrier is being transported by the reroute conveyor the pins are sequentially engaged by the gear rack to rotate the article carrier.

12. A system according to claim 11, further comprising guide means coupled to the collar for maintaining the rotational orientation of the article carrier when the carrier is not being reoriented by said reorienting means.

13. A system according to claim 10, further comprising means for detecting whether or not a said article carrier transported from the process conveyor has been reoriented; and a track switch coupled to the detecting means for routing said article carrier to the reroute conveyor when the detecting means detect that said article carrier has not been reoriented and for routing said article carrier for transportation to an unloading area when the detecting means detect that said article carrier has been reoriented.

14. A system according to claim 10, further comprising means for detecting misorientation of a said article carrier; and means responsive to said detection of misorientation of said article carriers for interrupting both radiation from said radiation source and said transport by the process conveyor.

15. An article irradiation system, comprising a radiation source;

a plurality of article carriers; and a process conveyor for transporting the article carriers past the radiation source:

wherein the radiation source is disposed for scanning articles carried by the article carriers being transported by the process conveyor with a radiation beam so that the transported articles are scanned at a given rate in a plane perpendicular to the direction of transport;

means for measuring a speed at which said article carrier is being transported past the radiation source;

means for processing said measurements to determine whether said article carrier transport speed is outside of a given range; and means responsive to said processing means for interrupting both radiation from said radiation source and said transport by the conveyor when the processing means determine that the article carrier transport speed is outside of said given range.

16. A system according to claim 15, wherein the measuring means include a member attached to each article carrier having a serrated edge extending away from the article carrier; and a limit switch disposed in relation to the conveyor so as to be periodically operated by contact with the serrated edge of said member as a said article carrier is being transported by the conveyor past the radiation source.

17. A system according to claim 16, wherein the processing means measure the frequency of said operation of the limit switch; and the responsive means interrupt said radiation and said transport when said measured frequency is outside a predetermined frequency range.

18. A system according to claim 15, wherein the radiation beam has a given width in the direction of transport, the system further comprising means for resuming said transport by the conveyor and said radiation from said radiation source; and means for controlling the acceleration and speed of transport by the conveyor upon said resumption in relation to a given scanning energy level rise rate and the given width of said radiation beam such that the portion of the article being scanned upon said interruption of radiation and transport is scanned with a total pre-and-post-interruption radiation dosage within a prescribed dosage range.

19. In combination for irradiating an article with an electron beam to sterilize such article, process conveyor means having first and second opposite ends;

first means for driving the process conveyor means at the first opposite end of the process conveyor means;

second means coupled to the first means for driving the process conveyor means at the second opposite end of the process conveyor means;

third means disposed between the first and second means for coordinating the movements of the first and second means;

fourth means disposed on the process conveyor means for holding the article for movement with the process conveyor means; and fifth means for irradiating the article with the electron beam in the space between the first and second means during the movement of the article with the process conveyor means to sterilize the articles.

20. A combination according to claim 19, further comprising means associated with the process conveyor means and the fifth means for providing an irradiation of the article by the electron beam from opposite sides of the article to provide for a uniform sterilization of the article.

21. A combination according to claim 19 wherein the fifth means is disposed to irradiate the article with the electron beam in a horizontal direction; and the fourth means being constructed to hold the article flat in the horizontal direction.

22. A combination according to claim 19, wherein the process conveyor means is operative to move the fourth means past the fifth means at a speed within a given range; and wherein the fifth means is operative to compensate for variations in the speed of movement of the fourth means past the fifth means within the given range.

23. A combination according to claim 22, further comprising sixth means for discontinuing the operation of the fifth means and the process conveyor means when the speed of movement of the process conveyor means varies outside of said given range.

24. In combination for irradiating an article with an electron beam to sterilize such article, first means for holding the article in a flat relationship;

second means for irradiating the article in the first means with the electron beam to sterilize the article; overhead conveyor means for moving the first means toward the second means from a position above the second means;

third means disposed relative to the overhead conveyor means for receiving the first means from the overhead conveyor means and for moving such article past the second means; and fourth means for releasing the first means from the overhead conveyor means when the first means becomes received by the third means for movement past the second means.

25. A combination according to claim 24, wherein the second means is disposed to irradiate the article horizontally with the electron beam through the side of the article.

26. A combination according to claim 24, further comprising fifth means associated with the second means and the fourth means for providing for an irradiation of the article horizontally with the electron beam through opposite sides of the article.

27. A combination according to claim 24, wherein the third means is disposed to move the article past the second means from a position below the disposition of the article on the first means.

28. In combination for irradiating an article with an electron beam to sterilize such article, first means for holding the article in a flat relationship;

second means for irradiating the article in the first means with the electron beam to sterilize the article;

third means disposed relative to the first means for moving the first means past the second means from a position below the first means;

fourth means disposed relative to the second and third means for receiving the first means at a position above the first means after the second means has irradiated the article with the electron beam; and fifth means for providing a transfer of the first means from the third means to the fourth means after the second means has irradiated the article with the electron beam.

29. A combination according to claim 28, wherein the second means is disposed relative to the first means for irradiating the article horizontally with the electron beam through one side of the article.

30. A combination according to claim 29, further comprising means associated with the third means for providing for the irradiation of the article with the electron beam by the second means through opposite sides of the article.

31. A combination according to claim 28, further comprising sixth means for holding the first means at a position above the first means for movement of the first means to a position for transfer to the third means when the first means reaches the third means; and seventh means for transferring the first means from the sixth means to the third means when the first means reaches the third means.

32. In combination for irradiating articles with an electron beam to sterilize such articles, first means for irradiating the articles with the electron beam;

a plurality of second means each constructed to hold an individual one of such articles in a particular relationship to the first means;

third means for storing the second means in the plurality in a staging area;

fourth means for transferring each individual one of the second means in sequence from the staging area and for moving such an individual one of the articles toward the first means;

fifth means for moving each individual one of the articles past the first means at a given speed; and sixth means for receiving each individual one of the first means transferred in sequence by the fourth means from the staging area and for accelerating such individual one of the first means to a speed above said given speed and for then decelerating such individual one of the first means to said given speed for transfer to the fifth means.

33. A combination according to claim 32, further comprising seventh means for transferring each individual one of the first means in sequence from the fourth means to the sixth means; and eighth means for transferring each individual one of the first means from the sixth means to the fifth means.

34. A combination according to claim 32, further comprising means for controlling the speed of the fifth means at said given speed value during the movement of each individual one of the second means past the first means.

35. A combination according to claim 34, further comprising means for interrupting the movement of the fifth means and the operation of the first means when the speed of the fifth means is outside a given range which embrace said given speed.

36. In combination for irradiating articles with an electron beam to sterilize such articles, a plurality of first means each constructed to hold an individual one of the articles;

second means for storing the articles in sequence in a staging area; escapement means for releasing the individual ones of the first means for movement from the escapement area;

third means associated with the escapement means for preventing the next one of the first means in the plurality from being released by the escapement means from the staging area until after the individual one of the first means in the plurality has moved past the escapement means;

fourth means for irradiating the articles in the individual ones of the first means with the electron beam; and fifth means for transporting each individual one of the first means past the fourth means after such individual one of the first means has been released from the staging area.

37. A combination according to claim 36, wherein the fourth means is operative to irradiate the article in each individual one of the first means horizontally after such individual one of the first means has been released from the staging area and has been transported to the fourth means; and further comprising sixth means associated with the fourth means and the fifth means for irradiating the article in each individual one of the first means horizontally through opposite lateral sides of such articles after such individual one of the first means has been released from the staging area and has been transported to the fourth means.

38. A combination according to claim 36, further comprising sixth means for maintaining the speed of the fifth means within a given range; and seventh means for interrupting the movement of the fifth means and the operation of the fourth means when the speed of movement of the fifth means is outside of said given range.

39. A combination according to claim 36, further comprising sixth means for moving each individual one of the first means to an unloading area after the irradiation of the article in such individual one of the first means.

40. In combination for irradiating an article with an electron beam to sterilize such article, first means for holding the article;

second means for irradiating the article with the electron beam;

third means for moving the first means past the second means for irradiation of the article with the electron beam by the second means;

fourth means for determining the speed of movement of the third means;

fifth means responsive to the determinations by the fourth means for maintaining the speed of the third means within a given range during the movement of the article past the second means;

sixth means for determining the speed of the movement of the article; and seventh means for interrupting the movement of the first means and the operation of the second means when the speed of movement of either the third means or the article is outside of said given range.

41. A combination according to claim 40, further comprising eighth means associated with the third means and the second means for providing for the irradiation of the article with the electron beam by the second means through opposite lateral sides of the article.

42. A combination according to claim 40, further comprising eighth means for defining a staging area for holding the article;

ninth means for providing a transfer of the article from the staging area to the third means for irradiation with the electron beam by the second means;

tenth means for defining an unloading area for holding the article; and eleventh means for providing a transfer of the article from the third means to the unloading area after the irradiation of the article with the electron beam by the second means.

43. In combination for irradiating articles with an electron beam to sterilize such articles, a plurality of first means each constructed to hold an individual one of the articles in the plurality;

second means for irradiating each individual one of the articles with the electron beam;

third means for holding the first means in the plurality in a stacked relationship in a staging area;

fourth means for providing a controlled transfer of each individual one of the first means in the stacked relationship from the staging area after the previous one of the first means in the stacked relationship in the staging area has been transferred from the staging area;

fifth means for maintaining a particular spacing between successive ones of the first means in the plurality after such successive ones of the first means in the plurality have been transferred from the staging area; and sixth means for moving the individual ones of the first means past the second means at a given speed after such individual ones of the first means have been transferred from the staging area.

44. A combination according to claim 43, further comprising seventh means associated with the sixth means for providing for the irradiation by the second means of each article from opposite lateral sides of such article during the movement of such article past the second means.

45. A combination according to claim 43, further comprising seventh means for determining the speed of the movement of each of the first means past the second means;

eighth means for determining the speed of the movement of the sixth means;

ninth means for maintaining the speed of the movement of the sixth means within a given range during movement of each of the first means past the second means; and tenth means for stopping the movement of the sixth means and for interrupting the operation of the second means when the speed of the movement of an individual one of the first means or of the sixth means is outside of said given range.

46. In combination for irradiating articles with an electron beam to sterilize such articles, a plurality of first means each constructed to hold an individual one of the articles;

second means for irradiating the articles with the electron beam;

third means for moving the first means in the plurality in sequence past the second means for irradiation of the articles in such first means by the electron beam;

fourth means for holding individual ones of the first means in a stacked relationship in a staging area;

fifth means for transferring successive ones of the first means from the staging area and for moving such successive ones of the first means to the third means for transfer to the third means; and sixth means for regulating the speed of movement of the fifth means to maintain a particular spacing between the successive ones of the first means of the fifth means.

47. A combination according to claim 46, wherein the fifth means is operative to change the speed of the movement of the successive ones of the first means with the fifth means to the speed of movement of the third means for transfer to the third means.

48. A combination according to claim 46, further comprising seventh means for regulating the speed of movement of the third means within a given range; and eighth means for interrupting the movements of the third and fifth means and the operation of the second means when the speed of movement of the third means is outside of said given range.

49. A combination according to claim 46, further comprising means associated with the third means for providing for the irradiation of the articles with the electron beam through opposite sides of the articles.

50. In combination for irradiating articles with an electron beam to sterilize such articles, a plurality of first means each having a body for holding individual ones of the articles, each of the first means having leading and trafiing ends;

second means for irradiating the articles in the individual ones of the first means with the electron beam;

third means for holding individual ones of the first means in a stacked relationship in a staging area;

fourth means for transferring the individual ones of the first means in the staging area in sequence from the staging area for movement past the second means for irradiation with the electron beam;

the leading and trailing ends of each of the first means being constructed to maintain a minimal spacing between the bodies of successive ones of the first means; and fifth means for operating upon the fourth means to maintain a particular spacing greater than the minimal spacing between the successive ones of the first means transferred from the staging area to the fourth means.

51. A combination according to claim 50, further comprising sixth means for moving the successive ones of the first means past the second means at a given speed for irradiation with the electron beam by the second means;

seventh means for transferring the successive ones of the first means on the fourth means to the sixth means; and eighth means for varying the speed of movement of the fourth means to provide a transfer of the first means from the fourth means to the sixth means at the speed of movement of the sixth means.

52. A combination according to claim 50, further comprising sixth means associated with the fourth means for preventing each of the successive ones of the first means in the staging area from being transferred from the staging area until the previous one of the successive ones of the first means in the staging area has been transferred by the fourth means from the staging area.

53. A combination according to claim 50, further comprising sixth means associated with the fourth means for providing for an irradiation of the articles with the electron beam by the second means from opposite sides of the articles during the movement of the articles past the second means.

54. In combination for irradiating an article with an electron beam to sterilize such article, first means for holding the article;

second means for irradiating the article with the electron beam;

third means for providing a first movement of the first means past the second means in a first particular relationship of the first means to the second means for the irradiation of the article by the electron beam;

fourth means for providing for a second movement of the first means by the third means past the second means;

fifth means for re-orienting the first means in the second movement past the second means in a second particular relationship to the second means to obtain an irradiation of the article in the first means by the second means, the second particular relationship of the first means to the second means being different from the first particular relationship of the first means to the second means;

sixth means for defining an unloading area for receiving the first means after the second movement of the first means by the third means past the second means;

seventh means for routing the first means to the unloading area after the second movement of the first means by the third means past the second means;

eighth means for indicating whether the first means has been properly routed by the seventh means to the unloading area after the second movement of the first means by the third means past the second means; and ninth means for interrupting the movement of the first means and the operation of the second means when the first means has not been properly routed to the unloading area after the second movement of the first means by the third means past the second means.

55. In combination for irradiating articles with an electron beam to sterilize the articles, a plurality of first means each constructed to hold an individual one of the articles;

second means for irradiating the articles with the electron beam;

third means for moving successive ones of the first means past the second means for an irradiation of the articles in such successive ones of the first means by the second means;

fourth means disposed relative to the movement of the successive ones of the first means by the third means past the second means for producing a signal upon each such movement; and fifth means for determining the frequency of the signal from the fourth means for indicating whether the successive ones of the first means are being moved by the third means at a speed within a given range.

56. A combination according to claim 55, further comprising sixth means for interrupting the movement of the third means and the operation of the second means when the frequency of the signal from the fourth means is outside a predetermined frequency range.

57. A combination according to claim 55, further comprising sixth means associated with the third means for providing for an irradiation by the second means of opposite sides of the articles in the successive ones of the first means with the electron beam.

58. A combination according to claim 55, further comprising sixth means for disposing the first means in the plurality in a staging area in a stacked relationship; and seventh means for providing for a transfer of the first means in the plurality in sequence from the staging area and for the transfer of such first means to the third means at the speed of movement of the third means.

59. In combination for irradiating an article with an electron beam to sterilize such article, first means for disposing the article on a horizontally disposed surface, second means for moving the first means in a horizontal direction, third means for irradiating the article with the electron beam horizontally from opposite sides of the article during the movement of the article by the second means past the third means to provide the article with a uniform radiation throughout the article, the second means being operative to move the first means at a substantially constant speed past the third means, and fourth means for moving the first means to the second means and for transporting the first means to the second means at the speed of movement of the second means.

60. In combination for irradiating an article with an electron beam to sterilize such article, first means for disposing the article on a horizontally disposed surface, second means for moving the first means in a horizontal direction, third means for irradiating the article with the electron beam horizontally from opposite sides of the article during the movement of the article by the second means past the third means to provide the article with a uniform radiation throughout the article, the second means being operative to move the first means at speeds within particular limits, and fourth means responsive to the speed of movement of the second means for discontinuing movement of the second means and the irradiation by the electron beam when the speed of the second means is outside the particular limits.

61. In combination for irradiating an article with an electron beam to sterilize such article, first means for holding the article;

second means for irradiating the article with the electron beam;

third means for providing a first movement of the first means past the second means in a first particular relationship of the first means to the second means for the irradiation of the article by the electron beam;

fourth means for providing for a second movement of the first means by the third means past the second means;

fifth means for re-orienting the first means in the second movement past the second means in a second particular relationship to the second means to obtain an irradiation of the article in the first means by the second means, the second particular relationship of the first means to the second means being different from the first particular relationship of the first means to the second means;

sixth means for determining whether the first means has the second particular relationship to the second means in the second movement of the first means by the third means past the second means; and seventh means for interrupting the movement of the third means and the irradiation by the second means when the sixth means determines that the first means does not have the second particular relationship to the second means in the second movement of the first means by the third means past the second means.

62. A system according to claim 1, wherein during said transport by the load conveyor, said speed of transport by the load conveyor is increased to a speed above the first speed and subsequently gradually reduced to be at the first speed when the article carrier is positioned on the process conveyor.

* * * * *

UNITED STATES PATENT AND TRADEMARK OFFICE

CERTIFICATE OF CORRECTION

PATENT NO. : 5,396,074

DATED : March 7, 1995

INVENTOR(S) : Richard O. Peck et al.

It is certified that error appears in the above-indentified patent and that said Letters Patent is hereby corrected as shown below:

Column 1, line 41, change "trafiing" to -- trailing--.

Column 2, line 3, change "careers" to --carriers--.

Column 2, line 48, change "transport:" to --transport--.

Column 2, line 50, change "source:" to --source;--.

Column 2, line 53 change "a" to --said--.

Column 2, line 68, change "rotatable" to --rotatably--.

Column 6, line 20, change "strum" to --struts--.

Column 7, line 50, delete the comma before "attached".

Column 13, line 35, delete "a".

Column 13, line 39 that portion of Eq. 11 reading "$S^2{}_{PMIN}$" should read: --$S_{PMIN}{}^2$--.

Column 13, line 48 change "carder" to "carrier".

UNITED STATES PATENT AND TRADEMARK OFFICE

CERTIFICATE OF CORRECTION

PATENT NO. : 5,396,074

DATED : March 7, 1995

INVENTOR(S) : Richard O. Peck et al.

It is certified that error appears in the above-indentified patent and that said Letters Patent is hereby corrected as shown below:

Column 14, line 42 change "Just" to --just--.

Column 14, line 45, change "earlier" to --carrier--.

Column 16, line 18, change "Just" to --just--.

Column 16, line 26, change "hack" to --track--.

Column 16, line 40, change "Just" to --just--.

Column 16, line 47, change "1 00" to --100--.

Column 16, line 48, change "1 00" to --100--.

Column 17, line 47, change "carrier" (second occurrence) to --carriers--.

Column 18, line 19, change "earners" to --carriers--.

Signed and Sealed this

Twelfth Day of September, 1995

Attest:

Bruce Lehman

BRUCE LEHMAN

*Attesting Officer* *Commissioner of Patents and Trademarks*

UNITED STATES PATENT AND TRADEMARK OFFICE

CERTIFICATE OF CORRECTION

PATENT NO. : 5,396,074

DATED : March 7, 1995

INVENTOR(S) : Richard O. Peck, et al.

It is certified that error appears in the above-identified patent and that said Letters Patent is hereby corrected as shown below:

Column 17, line 56, after "which" change "a" to --each--.

Column 18, line 41, after "when" change "a" to --each--.

Column 18, line 42, before "dog" delete "said".

Column 20, line 30, after "member" change "a" to --each--.

Column 22, line 48, change "first" to --second--.

Column 22, line 50, change "first" to --second--.

Column 22, line 52, change "first" to --second--.

Column 22, line 57, change "first" to --second--.

Column 22, line 60, change "first" to --second--.

Column 23, line 14, change "escapement" to --staging--.

UNITED STATES PATENT AND TRADEMARK OFFICE

CERTIFICATE OF CORRECTION

PATENT NO. : 5,396,074

DATED : March 7, 1995

INVENTOR(S) : Richard O. Peck, et al.

It is certified that error appears in the above-identified patent and that said Letters Patent is hereby corrected as shown below:

Column 25, line 22, after "means" change "of" to --by--.

Column 25, line 46, change "trafiing" to --trailing--.

Column 27, line 45, after "horizontally" change "from" to --at--.

Column 28, line 8, after "horizontally" change "from" to --at--.

Signed and Sealed this

Sixteenth Day of May, 2000

Attest:

Q. TODD DICKINSON

*Attesting Officer*

*Director of Patents and Trademarks*